United States Patent
Kim et al.

(10) Patent No.: US 9,210,552 B2
(45) Date of Patent: Dec. 8, 2015

(54) METHOD FOR RECEIVING MULTICAST DATA IN M2M DEVICE INCLUDED IN WIRELESS COMMUNICATION SYSTEM AND M2M DEVICE THEREFOR

(75) Inventors: Jeongki Kim, Anyang-si (KR); Youngsoo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 13/978,325

(22) PCT Filed: Jan. 3, 2012

(86) PCT No.: PCT/KR2012/000031
§ 371 (c)(1),
(2), (4) Date: Jul. 18, 2013

(87) PCT Pub. No.: WO2012/093828
PCT Pub. Date: Jul. 12, 2012

(65) Prior Publication Data
US 2013/0301515 A1    Nov. 14, 2013

Related U.S. Application Data

(60) Provisional application No. 61/429,193, filed on Jan. 3, 2011, provisional application No. 61/440,348, filed on Feb. 7, 2011, provisional application No. 61/483,717, filed on May 8, 2011, provisional application No. 61/486,782, filed on May 17, 2011.

(51) Int. Cl.
| | |
|---|---|
| *H04H 20/71* | (2008.01) |
| *H04W 4/06* | (2009.01) |
| *H04L 1/18* | (2006.01) |
| *H04L 1/00* | (2006.01) |

(52) U.S. Cl.
CPC .............. *H04W 4/06* (2013.01); *H04L 1/1864* (2013.01); *H04L 2001/0093* (2013.01)

(58) Field of Classification Search
CPC H04W 4/06; H04L 1/1864; H04L 2001/0093
See application file for complete search history.

(56) References Cited

U.S. PATENT DOCUMENTS

| | | | |
|---|---|---|---|
| 7,675,888 B2 * | 3/2010 | Modlin et al. | 370/335 |
| 2004/0184471 A1 * | 9/2004 | Chuah et al. | 370/420 |
| 2006/0007887 A1 * | 1/2006 | Kwon et al. | 370/329 |
| 2006/0117244 A1 * | 6/2006 | Cudak et al. | 714/774 |
| 2006/0209870 A1 | 9/2006 | Lee et al. | |
| 2009/0046637 A1 | 2/2009 | Kim et al. | |
| 2010/0146358 A1 * | 6/2010 | Kazmi et al. | 714/750 |
| 2010/0323737 A1 * | 12/2010 | Koo et al. | 455/509 |
| 2011/0103323 A1 * | 5/2011 | Wang et al. | 370/329 |
| 2011/0199953 A1 * | 8/2011 | Seok | 370/312 |
| 2011/0216686 A1 * | 9/2011 | Wu | 370/312 |
| 2013/0301515 A1 * | 11/2013 | Kim et al. | 370/312 |

FOREIGN PATENT DOCUMENTS

| | | |
|---|---|---|
| KR | 10-2006-0091132 A | 8/2006 |
| KR | 10-2006-0091525 A | 8/2006 |
| KR | 10-2010-0042228 A | 4/2010 |

* cited by examiner

*Primary Examiner* — Robert Wilson
(74) *Attorney, Agent, or Firm* — Birch, Stewart, Kolasch & Birch, LLP

(57) ABSTRACT

Disclosed are a method for receiving multicast data in a machine to machine (M2M) device in a wireless communication system and an M2M device therefor. The M2M device receiving multicast data according to the present invention, includes a receiver receiving multicast control information for transmitting multicast data from a base station, and the multicast control information includes a retransmission indicator field which indicates whether corresponding multicast data is retransmitted or not.

8 Claims, 8 Drawing Sheets

FIG. 3

METHOD FOR RECEIVING MULTICAST DATA IN M2M DEVICE INCLUDED IN WIRELESS COMMUNICATION SYSTEM AND M2M DEVICE THEREFOR

CROSS REFERENCE TO RELATED APPLICATIONS

This application is the National Phase of PCT/KR2012/000031 filed on Jan. 3, 2012, which claims priority under 35 U.S.C. §119(e) to U.S. Provisional Application Nos. 61/429,193 filed on Jan. 3, 2011, 61/440,348 filed on Feb. 7, 2011, 61/483,717 filed on May 8, 2011, and 61/486,782 filed on May 17, 2011, all of which are hereby expressly incorporated by reference into the present application.

TECHNICAL FIELD

The present invention relates to wireless communication, and more particularly, to a method for receiving multicast data at an M2M device and an M2M device therefor.

BACKGROUND ART

Machine-to-Machine (M2M) communication refers to communication between electronic devices in the literal sense of the word. In a broad sense, M2M communication means wired or wireless communication between electronic devices or communication between devices controlled by people. Recently, M2M communication has come to refer to wireless communication between electronic devices, performed without human intervention.

In the early 1990s when the concept of M2M communication was first introduced, M2M communication was recognized as remote control, telematics, or so and the market derived therefrom was very limited. However, as M2M communication has rapidly developed in the past few years, market therefor has vastly expanded, attracting worldwide attention. In particular, M2M communication has exerted an important influence on the field of fleet management in a Point-Of-Sales (POS) system and a security related application market, remote monitoring of machines or facilities, and smart meter for measuring operating time of mechanical construction equipment and automatically measuring consumption of heat or electricity. In the future, M2M communication will be extended to various applications in association with existing mobile communication, wireless high-speed Internet, and low-output communication solutions such as Wi-Fi and ZigBee. That is, M2M communication will evolve from Business-to-Business (B2B) applications to Business-to-Consumer (B2C) applications.

In M2M communication, all machines equipped with a Subscriber Identity Module (SIM) card are able to transmit and receive data so that they can be remotely managed and controlled. For example, M2M communication technology can be used for numerous machines and equipment such as automobiles, trucks, trains, shipping containers, vending machines, tankers, etc., and the variety of applications thereof will continue to expand.

Conventionally, mobile stations were managed individually for one-to-one communication between a Base Station (BS) and a Mobile Station (MS). Assuming that numerous M2M devices communicate with the BS through one-to-one communication, network overload is likely to occur due to signaling generated between each of the M2M devices and the BS. As M2M communication rapidly spreads and expands, an overhead problem may occur due to communication between the M2M devices or between the M2M devices and BSs.

Meanwhile, there is the case in which the BS needs to transmit multicast data to the M2M devices. However, a method for reliably transmitting multicast data to the M2M devices has not been specifically proposed up to now.

DISCLOSURE

Technical Problem

An object of the present invention devised to solve the problem lies in a method for receiving multicast data at an M2M device in a wireless communication system.

Another object of the present invention lies in an M2M device for receiving multicast data in a wireless communication system.

It will be appreciated by persons skilled in the art that that the technical objects that can be achieved through the present invention are not limited to what has been particularly described hereinabove and other technical objects of the present invention will be more clearly understood from the following detailed description.

Technical Solution

The object of the present invention can be achieved by providing a method for receiving multicast data at a Machine-to-Machine (M2M) device in a wireless communication system, including receiving multicast control information related to multicast data transmission from a base station, wherein the multicast control information includes a retransmission indicator field indicating whether the multicast data is retransmitted or not. If the retransmission indicator field indicates that the multicast data is retransmitted, the multicast control information may further include a number-of-retransmissions field indicating the number of retransmissions of the multicast data. The multicast control information may further include a field indicating a retransmission time point of the multicast data. The retransmission time point of the multicast data may be indicated by an offset value given in units of frames or subframes). The multicast control information may further include a Subpacket Identifier (SPID) field of the multicast data. The multicast control information may be of a multicast A-MAP Information Element (IE) message type.

In another aspect of the present invention, provided herein is a method for receiving multicast data at a Machine-to-Machine (M2M) device in a wireless communication system, including receiving multicast data from a base station, and transmitting a retransmission request for the multicast data through a ranging request message, upon failing to decode the multicast data. The method may further include receiving the multicast data from the base station through a ranging response message in response to the retransmission request. The method may further include transmitting a positive ACK signal, upon succeeding in decoding the multicast data received through the ranging response message. The method may further include receiving uplink resource assignment information for transmitting an acknowledgement (ACK) signal for the multicast data in response to the retransmission request from the base station, together with the multicast data. The method may further include transmitting a positive ACK signal to the base station based on uplink resource allocation information for transmitting an ACK signal for the multicast data, upon succeeding in decoding the multicast data retransmitted from the base station. The uplink resource allocation information for transmitting an ACK signal for the multicast data may be transmitted as a unicast control information type.

In another aspect of the present invention, provided herein is a method for receiving multicast data at a Machine-to-Machine (M2M) device in a wireless communication system, including receiving multicast data from a base station, and transmitting a retransmission request for the multicast data in the case of failing to decode the multicast data, wherein the case of failing to decode the multicast data is one of a decoding error of a downlink multicast data burst, missing of a MAC Protocol Data Unit (MPDU) sequence number corresponding to the multicast data confirmed by checking the MPDU sequence number, expiration of a timer which is reset whenever the multicast data is received, and non-reception of control information for the multicast data at an indicated multicast data transmission start time.

In another aspect of the present invention, provided herein is a Machine-to-Machine (M2M) device for receiving multicast data in a wireless communication system, including a receiver for receiving multicast control information for multicast data transmission from a base station, wherein the multicast control information includes a retransmission indicator field indicating whether the multicast data is retransmitted.

In another aspect of the present invention, provided herein is a Machine-to-Machine (M2M) device for receiving multicast data in a wireless communication system, including a receiver for receiving multicast data from a base station, a processor for decoding the multicast data, and a transmitter for transmitting a retransmission request for the multicast data through a ranging request message, when the processor fails to decode the multicast data.

In another aspect of the present invention, provided herein is a Machine-to-Machine (M2M) device for receiving multicast data in a wireless communication system, including a receiver for receiving multicast data from a base station, a processor for decoding the received multicast data, and a transmitter for transmitting a retransmission request for the multicast data in the case in which the processor fails to decode the multicast data, wherein the case in which the processor fails to decode the multicast data is one of a decoding error of a downlink multicast data burst, missing of a MAC Protocol Data Unit (MPDU) sequence number corresponding to the multicast data confirmed by checking the MPDU sequence number, expiration of a timer which is reset whenever the multicast data is received, and non-reception of control information for the multicast data at an indicated multicast data transmission start time.

Advantageous Effects

According to various embodiments of the present invention, since an M2M device reliably receives multicast data, communication performance can be remarkably improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included as a part of the detailed description to provide a further understanding of the invention, provide embodiments of the invention and together with the description serve to explain the principles of the invention. In the drawings.

FIG. 3 is a view illustrating an example of transmission of a NACK signal for multicast data transmission through puncturing of edge symbols over a fast feedback channel;

BEST MODE

Figure 1:
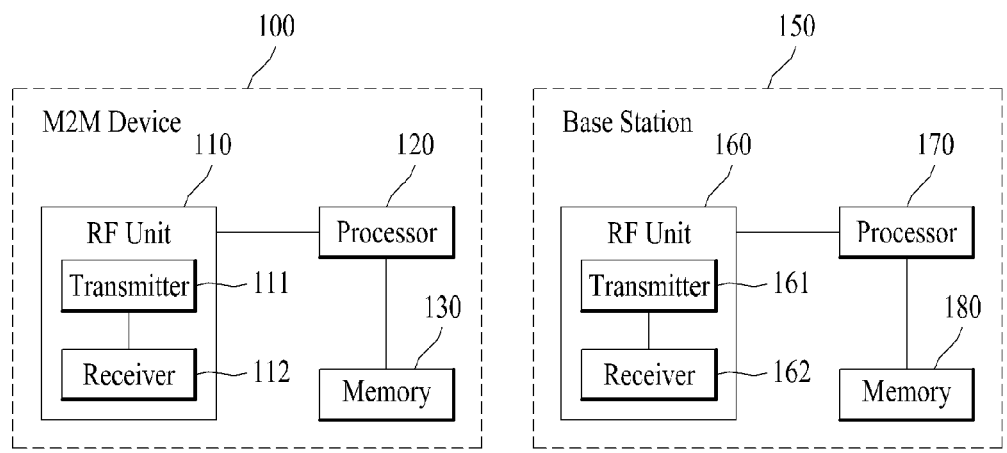
FIG. 1 is a view schematically describing the construction of an M2M device and a BS according to an exemplary embodiment of the present invention.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following detailed description is given under the assumption of a 3GPP LTE mobile communication system, it is applicable to other mobile communication systems except for matters that are specific to the 3GPP LTE system.

In some instances, known structures and devices are omitted or are shown in block diagram form, focusing on important features of the structures and devices, so as not to obscure the concept of the present invention. The same reference numbers will be used throughout this specification to refer to the same parts.

The following description assumes that a User Equipment (UE) refers to a mobile or fixed user equipment such as a Mobile Station (MS) or an Advanced Mobile Station (AMS) and a Base Station (BS) refers to an arbitrary node of a network stage communicating with a UE, such as a Node B, an eNode B, or Access Point (AP).

In a mobile communication system, a UE may receive information on DL from a BS, and the UE may transmit information on UL. Information transmitted and received by the UE includes data and various control information. A variety of physical channels are present according to types or usages of information transmitted or received by the UE.

Hereinafter, communication between M2M devices refers to communication between MSs via a BS or between a BS and MSs without human intervention. Accordingly, an M2M device refers to an MS which can support the above communication between M2M devices. An Access Service Network (ASN) for an M2M service is defined as an M2M ASN and a network entity communicating with M2M devices is called an M2M server. The M2M server executes an M2M application and provides an M2M specific service for one or more M2M devices. M2M features indicate features of an M2M application and one or more features may be necessary to provide the application. An M2M device group refers to a group of M2M devices which share one or more features in common.

Devices performing communication according to an M2M scheme (which may be referred to as M2M devices, M2M communication devices, Machine Type Communication (MTC) devices, etc.) in a given network will increase in number as application types thereof increase. The application types of the devices, which is being discussed, include (1) security, (2) public safety, (3) tracking and tracing, (4) payment, (5) healthcare, (6) remote maintenance and control, (7) metering, (8) consumer device, (9) fleet management in a POS system and security related application market, (10) M2M communication of a vending machine, (11) remote monitoring of machines or facilities, and smart meter for measuring operating time of mechanical construction equipment and automatically measuring consumption of heat or electricity, and (12) surveillance video communication of a surveillance camera. However, the application types of the devices are not limited thereto and various application types of the devices may be applied.

Another feature of M2M devices is that they have low mobility or have no mobility. This means that the M2M devices are stationary for a considerably long time. An M2M communication system may simplify or optimize mobility related operations for a specific M2M application having a fixed location, such as secured access and surveillance, public safety, payment, remote maintenance and control, and metering.

Thus, as the application types of the devices increase, the number of M2M communication devices may rapidly increase compared to the number of general mobile communication devices. Accordingly, if each of the M2M devices individually communicates with a BS, a wireless interface or a network may be subjected to severe load.

Hereinafter, embodiments of the present invention will be described when M2M communication is applied to a wireless communication system (e.g. IEEE 802.16e/m). However, the present invention is not limited by the embodiments and is applicable to other communication systems such as a 3GPP LTE system.

FIG. 1 is a view schematically describing the construction of an M2M device and a BS according to an exemplary embodiment of the present invention.

In FIG. 1, an M2M device 100 (which may be called an M2M communication device but is referred to as an M2M device hereinbelow) and a BS 150 may include Radio Frequency (RF) units 110 and 160, processors 120 and 170, and, as optional units, memories 130 and 180, respectively. The RF units 110 and 160 may include transmitters 111 and 161 and receivers 112 and 162, respectively. The transmitter 111 and the receiver 112 of the M2M device 100 are configured so as to transmit signals to and receive signals from the BS 150 and other M2M devices. The processor 120 is functionally connected to the transmitter 111 and the receiver 112 to control signal transmission and reception to and from other devices through the transmitter 111 and the receiver 112. The processor 120 processes a transmission signal and then transmits the processed signal to the transmitter 111. The processor 120 also processes a signal received from the receiver 112. When needed, the processor 120 may store information included in exchanged messages in the memory 130. The M2M device 100 having the above-described configuration may implement methods according to various embodiments of the present invention described below. Although not shown in FIG. 1, the M2M device 100 may include many additional components according to an application type thereof. If the M2M device 100 is designed for smart metering, it may further include a component for power measurement. The power measuring operation may be controlled by the processor 120 of FIG. 1 or a separately configured processor (not shown).

While communication is conducted between the M2M device 100 and the BS 150 in the illustrated case of FIG. 1, M2M communication may also be performed between M2M devices according to the present invention. Each device having the same configuration illustrated in FIG. 1 may perform the methods according to various embodiments of the present invention described below.

The transmitter 161 and the receiver 162 of the BS 150 are configured to transmit signals to and receive signals from another BS, an M2M server, and M2M devices. The processor 170 is functionally connected to the transmitter 161 and the receiver 162 to thereby control signal transmission and reception to and from other devices through the transmitter 161 and the receiver 162. The processor 170 processes a transmission signal and then transmits the processed signal to the transmitter 161. The processor 170 also processes a signal received from the receiver 162. When needed, the processor 170 may store information included in an exchanged message in the memory 180. The BS 150 having such configuration may perform methods according to various embodiments of the present invention described below.

The processors 120 and 170 of the M2M device 110 and the BS 150 command (e.g. control, adjust, and manage) operations of the M2M device 110 and the BS 150, respectively. The processors 120 and 170 may be connected respectively to the memories 130 and 180 that store program code and data. The memories 130 and 180 are connected to the processors 120 and 170 and store Operating Systems (OS), applications, and general files.

The processors 120 and 170 may also be called controllers, microcontrollers, microprocessors, or microcomputers. Meanwhile, the processors 120 and 170 may be implemented by various means, for example, hardware, firmware, software, or combinations thereof. In a hardware configuration, the processors 120 and 170 may include one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), etc. which are configured to implement the present invention.

In a firmware or software configuration, the embodiments of the present invention may be implemented in the form of a module, a procedure, a function, etc. Firmware or software configured to implement the present invention may be included in the processors 120 and 170, or may be stored in the memories 130 and 180 and executed by the processors 120 and 170.

In multicast transmission, a situation in which all M2M devices within a group have not received multicast data may occur. Accordingly, a method capable of reliably transmitting multicast data to M2M devices within a group is needed. To confirm whether M2M devices have successfully received multicast traffic transmitted by a BS, each M2M device needs to transmit an Acknowledgement (ACK) signal for reception of multicast traffic to the BS. Since the M2M device transmits the ACK signal to the BS in a unicast form, transmission of the ACK signal for reception of multicast traffic may cause waste of radio resources. This leads to a serious problem of aggravating waste of resources when there are many M2M devices within a multicast group in a wireless communication system in which M2M devices are used Therefore, it may be undesirable for all M2M devices within a multicast group to transmit ACK signals (e.g. Hybrid Automatic Repeat Request (HARQ) ACK, Medium Access Control (MAC) ACK message, or MAC ACK header) in order to confirm whether transmitted multicast traffic has accurately been received. This increases overhead of a multicast MAP Information Element (IE) because, if HARQ ACK channels are used, information for allocating the HARQ ACK channels to all of the M2M devices within the multicast group should be included in control information (MAP).

Accordingly, the present invention proposes a method capable of reducing overhead while reliably transmitting multicast traffic.

First Embodiment

The first embodiment of the present invention relates to a method for allocating individual ACK channels to all M2M devices within a multicast group.

Upon allocating resources for transmission of multicast data to M2M devices within a multicast group, a BS may individually allocate HARQ ACK channels to all of the M2M devices within the multicast group. In this case, the location of an ACK channel to be used by each M2M device may be configured to correspond to an index (a user index or user identifier (ID)) in each user bitmap of the multicast group. For example, assuming that a user index of one M2M device in a multicast group is 5, the M2M device will use an ACK channel at the fifth location from the start of ACK channels for the multicast group. To this end, the start location of an ACK channel for the multicast group needs to be included in multicast control information (e.g. an Advanced-MAP (A-MAP) IE or a multicast MAP IE).

If the start of the user index within a multicast group differs according to each multicast group, the BS needs to transmit information as to the start of the user index in control information (e.g. multicast A-MAP IE).

The following Table 1 shows an example of a multicast A-MAP IE transmitted by a BS to an M2M device.

TABLE 1

| Syntax | Size | Value | Condition |
|---|---|---|---|
| Multicast Group ID | 15 | | |
| Burst size | 6 | Burst size as indicated in the first 39 entries in Table 958 | |
| Resource index | 11 | 5 MHz: 0 in first 2 MSB bits + 9 bits for resource index 10 MHz: 11 bits for resource index 20 MHz: 11 bits for resource index Resource index includes location and allocation size. | |
| Long TTI Indicator | 1 | Indicates number of AAI subframes spanned by the allocated resource. 0b0: 1 AAI subframe (default TTI) | |

TABLE 1-continued

| Syntax | Size | Value | Condition |
|---|---|---|---|
| | | 0b1: 4 DL AAI subframes for FDD or all DL AAI subframes for TDD (long TTI) | |
| HFA start offset | 4 | Indicates the start of the HARQ feedback channel index used for M2M devices belonging to multicast group. | |
| } | | | |
| ... | ... ... | | ... |

Referring to Table 1, the multicast A-MAP IE may include a multicast group ID field, a burst size field, a resource index field, a long TTI indicator field, and a HARQ Feedback Allocation (HFA) start offset field.

The processor 120 of an M2M device may decode the multicast group ID field to confirm that a multicast group ID corresponds thereto and may decode the burst size field to obtain information about a burst size of multicast data. The processor 120 of the M2M device may decode the resource index field to acquire a resource index allocated for transmission of multicast data to M2M devices within a multicast group. The processor 120 of the M2M device may also decode the HFA start offset field to identify the start of a HARQ feedback channel index used for M2M devices within a specific multicast group in order for a BS to accurately allocate HARQ channels. The M2M device may transmit an ACK signal for multicast data to the BS through the HARQ feedback allocation resource.

Second Embodiment

The second embodiment according to the present invention relates to retransmission of multicast traffic without feedback from an M2M device.

In the second embodiment, a BS retransmits multicast traffic without any feedback from the M2M device in order to reliably transmit multicast traffic.

Third Embodiment

The third embodiment of the present invention relates to synchronous non-adaptive multicast retransmission.

A BS transmits control information about multicast traffic through a multicast control information message (e.g. a multicast A-MAP IE). The BS may inform an M2M device of the number of retransmission times of corresponding multicast traffic through the multicast A-MAP IE. In this case, the BS may retransmit multicast traffic without transmitting the multicast A-MAP IE and retransmit multicast traffic to the M2M device through the same subframe and the same resource region (e.g. LRUs) in the next time unit (e.g. the next frame) of a first transmitted time unit (e.g. a frame) of multicast traffic. In this case, a subpacket of multicast traffic is generated using a conventional HARQ scheme. The first Subpacket ID (SPID) is 0 and subsequent SPID values may be determined using a rule such as (previous SPID+1) % (number of SPIDs). For example, if the number of SPIDs is 2, the second SPID will be 1 and the third SPID will be 0.

The following Table 2 shows an example of a multicast A-MAP IE according to the third embodiment of the present invention.

TABLE 2

| Syntax | Size | Value | Condition |
|---|---|---|---|
| Multicast Group ID | 15 | | |
| Burst size | 6 | Burst size as indicated in the first 39 entries in Table 958 | |

TABLE 2-continued

| Syntax | Size | Value | Condition |
|---|---|---|---|
| Resource index | 11 | 5 MHz: 0 in first 2 MSB bits + 9 bits for resource index<br>10 MHz: 11 bits for resource index<br>20 MHz: 11 bits for resource index<br>Resource index includes location and allocation size. | |
| Long TTI Indicator | 1 | Indicates number of AAI subframes spanned by the allocated resource.<br>0b0: 1 AAI subframe (default TTI)<br>0b1: 4 DL AAI subframes for FDD or all DL AAI subframes for TDD (long TTI) | |
| Retransmission indicator | 1 | Indicates whether corresponding multicast traffic is retransmitted<br>0: Non-retransmission of multicast traffic.<br>1: Retransmission of multicast traffic | |
| If (retransmission indicator ==1) {<br>  Num_of_reTx | | | |
| | 2 | Number of retransmissions<br>0: indicates that the number of retransmissions is 1<br>1: indicates that the number of retransmissions is 2<br>2: indicates that the number of retransmissions is 3<br>4: indicates that the number of retransmissions is 4 | |
| }<br>... | ... | ... | ... |

Referring to Table 2, the multicast A-MAP IE may include a multicast group ID field, a burst size field, a resource index field, a long TTI indicator field, a retransmission indicator field, and a number-of-retransmissions (Num_of_reTx) field.

The processor 120 of an M2M device may decode the multicast group ID field to confirm that a multicast group ID corresponds thereto and may decode the burst size field to obtain information about a burst size of multicast data. The processor 120 of the M2M device may decode the resource index field to acquire a resource index allocated for transmission of multicast data to M2M devices within a multicast group. The processor 120 of the M2M device may also decode the retransmission indicator field to confirm whether corresponding multicast traffic is retransmitted. If the multicast traffic is retransmitted, the processor 120 of the M2M device may decode the number-of-retransmissions field (Num_of_reTx) to confirm the number retransmissions. Whenever the multicast traffic is retransmitted, a value of Num_of_reTx is decreased by 1.

Fourth Embodiment

The fourth embodiment of the present invention relates to synchronous adaptive multicast retransmission.

A BS may inform an M2M device of a retransmission time point of multicast traffic (e.g. the same subframe as the next time unit (e.g. the next frame) of previous transmission) and the location of a retransmission resource region through a multicast A-MAP IE corresponding to a corresponding time point.

A HARQ subpacket may be determined by an order as in the above third embodiment and may be transmitted only for an SPID of 0 in all transmissions in the case of an adaptive scheme.

Fifth Embodiment

The fifth embodiment of the present invention relates to asynchronous adaptive multicast retransmission.

A transmission time point of multicast traffic transmitted by a BS may vary in units of frames or subframes. To this end, the BS may inform an M2M device of a retransmission time point of multicast traffic through a multicast A-MAP IE in units of frames or subframes. If frame based retransmission is performed, multicast traffic may be retransmitted in the same subframe as a previous transmission. Since this scheme is adaptively performed, if multicast traffic is retransmitted next, the BS may include a transmission time point for next retransmission while transmitting the multicast A-MAP IE for retransmission. In this case, a time point different from a transmission time point of previous transmission may be allocated. A HARQ subpacket may be determined by an order as in the above third embodiment and may be transmitted only for an SPID of 0 in all transmissions in the case of an adaptive scheme.

The following Table 3 shows an example of a multicast A-MAP IE according to the fifth embodiment of the present invention.

TABLE 3

| Syntax | Size | Value | Condition |
|---|---|---|---|
| Multicast Group ID | 15 | | |
| Burst size | 6 | Burst size as indicated in the first 39 entries in Table 958 | |
| Resource index | 11 | 5 MHz: 0 in first 2 MSB bits + 9 bits for resource index<br>10 MHz: 11 bits for resource index<br>20 MHz: 11 bits for resource index<br>Resource index includes location and allocation size. | |

TABLE 3-continued

| Syntax | Size | Value | Condition |
|---|---|---|---|
| Long TTI Indicator | 1 | Indicates number of AAI subframes spanned by the allocated resource. 0b0: 1 AAI subframe (default TTI) 0b1: 4 DL AAI subframes for FDD or all DL AAI subframes for TDD (long TTI) | |
| Retransmission indicator | 1 | Indicates whether corresponding multicast traffic is retransmitted 0: Non-retransmission of multicast traffic. 1: Retransmission of multicast traffic | |
| If (retransmission indicator ==1) { | | | |
| Num_of_reTx | 2 | Number of retransmissions 0: indicates that the number of retransmissions is 1 1: indicates that the number of retransmissions is 2 2: indicates that the number of retransmissions is 3 4: indicates that the number of retransmissions is 4 | |
| Next frame/subframe offset } | 3 | May indicate next retransmission time point in units of frames or subframes | |
| . . . | . . . | . . . | . . . |

Referring to Table 3, the multicast A-MAP IE may include a multicast group ID field, a burst size field, a resource index field, a long TTI indicator field, a retransmission indicator field, a number-of-retransmissions (Num_of_reTx) field, and the next frame/subframe offset field indicating a retransmission time point.

The processor 120 of an M2M device may decode the multicast group ID field to confirm that a multicast group ID corresponds thereto and may decode the burst size field to obtain information about a burst size of multicast data. The processor 120 of the M2M device may decode the resource index field to acquire a resource index allocated for transmission of the multicast data to M2M devices belonging to a multicast group.

The processor 120 of the M2M device may also decode the retransmission indicator field to confirm whether a corresponding multicast traffic is retransmitted. If multicast traffic is retransmitted, the processor 120 of the M2M device may decode the number-of-retransmissions (Num_of_reTx) field to confirm the number of retransmissions. Whenever multicast traffic is retransmitted, a value of Num_of_reTx is decreased by 1.

The processor 120 of the M2M device may decode the next frame/subframe offset field to identify when the multicast traffic is retransmitted in the unit of frames or subframes.

Sixth Embodiment

The sixth embodiment of the present invention relates to asynchronous non-adaptive multicast retransmission.

A transmission time point of multicast traffic transmitted by a BS may vary in units of frames or subframes. To this end, the BS may inform an M2M device of a retransmission time point of multicast traffic through a multicast A-MAP IE in units of frames or subframes. If frame based retransmission is performed, multicast traffic may be retransmitted to the M2M device in the same subframe as a subframe used in previous transmission.

Since this scheme is non-adaptively performed, the BS does not transmit the multicast A-MAP IE for retransmission and a transmission point for next retransmission may be set based on a value included in a first multicast A-MAP IE. For example, if the next frame offset is two frames and a frame number of first transmission is 2, the BS may perform the second transmission in a frame number 4 and perform the third transmission in a frame number 6. Whenever retransmission is performed, a value of Num_of_reTx is decreased by 1.

The following Table 4 shows an example of a multicast A-MAP IE according to the sixth embodiment of the present invention.

TABLE 4

| Syntax | Size | Value | Condition |
|---|---|---|---|
| Multicast Group ID | 15 | | |
| Burst size | 6 | Burst size as indicated in the first 39 entries in Table 958 | |
| Resource index | 11 | 5 MHz: 0 in first 2 MSB bits + 9 bits for resource index 10 MHz: 11 bits for resource index 20 MHz: 11 bits for resource index Resource index includes location and allocation size. | |
| Long TTI Indicator | 1 | Indicates number of AAI subframes spanned by the allocated resource. 0b0: 1 AAI subframe (default TTI) 0b1: 4 DL AAI subframes for FDD or all DL AAI subframes for TDD (long TTI) | |

TABLE 4-continued

| Syntax | Size | Value | Condition |
|---|---|---|---|
| Retransmission indicator | 1 | Indicates whether corresponding multicast traffic is retransmitted<br>0: Non-retransmission of multicast traffic.<br>1: Retransmission of multicast traffic | |
| If (retransmission indicator ==1) { | | | |
|   Num_of_reTx | 2 | Number of retransmissions<br>0: indicates that the number of retransmissions is 1<br>1: indicates that the number of retransmissions is 2<br>2: indicates that the number of retransmissions is 3<br>4: indicates that the number of retransmissions is 4 | |
|   Next frame/subframe offset | 3 | May indicate next retransmission time point in units of frames or subframes | |
|   SPID | 2 | Indicates subpacket ID of multicast traffic | |
| } | | | |
| ... | ... ... | | ... |

Referring to Table 4, the multicast A-MAP IE may include a multicast group ID field, a burst size field, a resource index field, a long TTI indicator field, a retransmission indicator field, a number-of-retransmissions (Num_of_reTx) field, the next frame/subframe offset field indicating a retransmission time point, and an SPID field indicating a subpacket IE of multicast traffic.

The processor 120 of an M2M device may decode the multicast group ID field to confirm that a multicast group ID corresponds thereto and may decode the burst size field to obtain information about a burst size of multicast data. The processor 120 of the M2M device may decode the resource index field to acquire a resource index allocated for transmission of the multicast data to M2M devices within a multicast group.

The processor 120 of the M2M device may also decode the retransmission indicator field to confirm whether corresponding multicast traffic is retransmitted. If multicast traffic is retransmitted, the processor 120 of the M2M device may decode the number-of-retransmissions (Num_of_reTx) field to confirm the number retransmissions. Whenever multicast traffic is retransmitted, a value of Num_of_reTx is decreased by 1.

The processor 120 of the M2M device may decode the next frame/subframe offset field to identify when multicast traffic is retransmitted in the unit of frames or subframes. The processor 120 of the M2M device may decode an SPID field to obtain an SPID of retransmitted multicast traffic. Since the multicast A-MAP IE may include an ID for retransmission for corresponding multicast data and the multicast data is transmitted using an Incremental Redundancy (IR) method through the ID, the M2M device can obtain IR gain of multicast data transmission.

Hereinafter, a multicast data retransmission method based on a shared NACK channel according to the present invention will be described.

To confirm whether an M2M device has successfully received multicast traffic, a BS may allocate a shared NACK channel to M2M devices through a multicast A-MAP IE upon transmitting the multicast traffic. Upon receiving multicast data, if the M2M device fails to decode the multicast data, the M2M device may transmit a NACK signal to the BS through the allocated shared NACK channel.

If the BS transmits multicast data and detects the NACK signal from the M2M device through the shared NACK channel corresponding to the multicast data, the BS determines that one or more of M2M devices within a group have not received the multicast data and performs a retransmission process of the multicast data.

Since the shared NACK channel is used by not only corrected-mode M2M devices but also idle-mode M2M devices, it is necessary to correctly design the shared NACK channel. That is, if the shared NACK channel is configured using a conventional uplink control channel, the shared NACK channel may function as interference with respect to uplink control signals of other M2M devices by signal transmission of M2M devices that have not established uplink synchronization. Accordingly, the present invention proposes a method for solving this problem.

Seventh Embodiment

The seventh embodiment of the present invention relates to design of a shared NACK channel. First, design of a new shared NACK channel is considered. For transmission to idle-mode M2M devices, a dedicated shared NACK channel different from an existing channel is designed and a BS informs M2M devices of the dedicated shared NACK channel so that the M2M devices may transmit NACK signals upon occurrence of decoding error of multicast data. That is, a shared NACK channel of a larger size than the existing channel is designed. The shared NACK channel may be designed based on a HARQ feedback channel, a Channel Quality Indicator Channel (CQICH) (e.g. a fast feedback channel), or a ranging channel.

Next, allocation of three successive shared NACK channels (e.g. HARQ feedback channels or fast feedback channels) may be considered.

Figure 2:
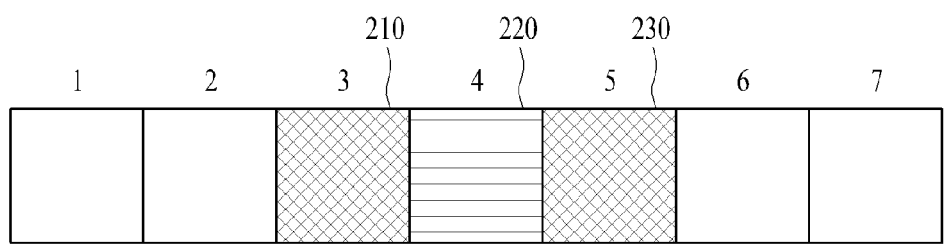
FIG. 2 is a view illustrating design of shared NACK channels for transmitting NACK signals for multicast data transmission.

FIG. 2 is a view illustrating design of shared NACK channels for transmitting NACK signals for multicast data transmission.

Referring to FIG. 2, a BS may allocate conventional HARQ feedback channels or fast feedback channels to M2M devices as shared NACK channels. To prevent interference with other M2M devices, the BS may allocate three successive HARQ feedback channels or fast feedback channels 210, 220, and 230 to M2M devices. In this case, if the BS informs the M2M devices of only a number of the first channel 210, the M2M devices may identify that three successive channels are allocated based on the first channel 210. For example, M2M devices may transmit NACK signals through the second channel 220 of the three HARQ feedback channels or fast feedback channels.

In FIG. 2, an example in which the BS allocates three NACK channels to M2M devices is shown. If the shared NACK channels are HARQ feedback channels, HARQ feedback channels 210, 220, and 230 of channel numbers 3, 4, and 5 are allocated and the M2M devices may transmit NACK signals through the HARQ feedback channel 220 of channel number 4 to the BS. Meanwhile, three fast feedback channels (CQICHs) instead of HARQ feedback channels may be allocated as the shared NACK channels.

Next, transmission of a codeword through puncturing of an edge symbol over a fast feedback channel at an M2M device is considered.

Figure 3:
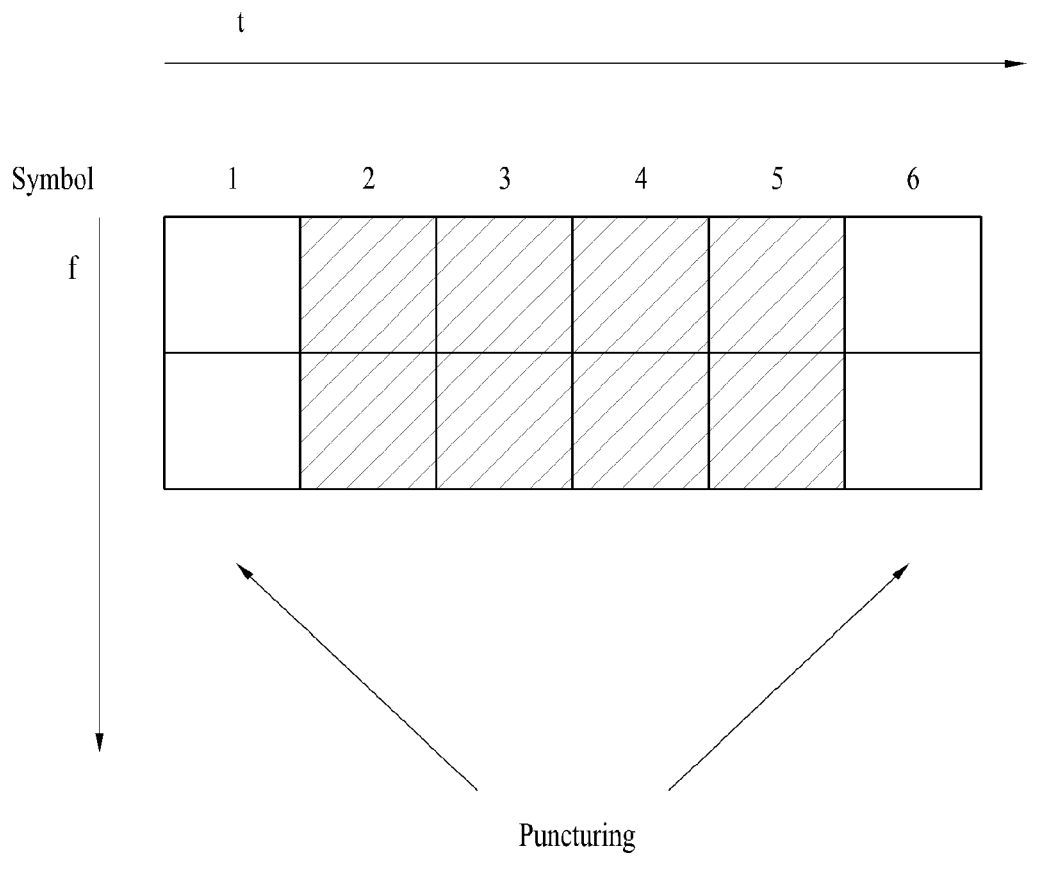

FIG. 3 is a view illustrating an example of transmission of a NACK signal for multicast data transmission through puncturing of edge symbols over a fast feedback channel.

In an IEEE 802.16m system, a fast feedback channel is comprised of six successive symbols, each of which is used to transmit a codeword. Upon transmitting a NACK signal through a shared fast feedback channel, all M2M devices may use the same codeword designated by a BS. In the case of a 6-bit codeword as in an IEEE 802.16e or IEEE 802.16m system, the M2M devices use a specific single codeword as a NACK signal. A conventionally used codeword (e.g. 000000 or 111111) or a reserved codeword (16 to 54) may be used. Here, the first and last (sixth) symbols are used only for mapping with a codeword and are not used for actual transmission. In this case, since edge symbols are not used, interference caused by uplink non-synchronization can be considerably reduced.

Next, transmission of a shared NACK signal using a ranging channel at M2M devices may be considered.

The BS may determine a dedicated ranging code capable of being used as a shared NACK signal in a system and allocate a ranging area capable of transmitting the ranging code to the M2M device. Then, the M2M devices may transmit the dedicated ranging code through a channel allocated for transmitting the NACK signal. The ranging channel or the ranging code may be a periodic ranging channel/code or an initial ranging code/channel.

Eighth Embodiment

The eight embodiment of the present invention relates to a data retransmission request method using a unicast method.

If the processor 120 of an M2M device determines that multicast data has not been successfully decoded thereby, the M2M device may request that the BS retransmit the multicast data using a unicast method. Upon receiving a retransmission request of the multicast data from a specific M2M device, the BS may retransmit the multicast data to the M2M device in unicast or multicast form.

Ninth Embodiment

The ninth embodiment of the present invention relates to a multicast data retransmission method through an update procedure (a ranging response message (e.g. an AAI-RNG-RSP message)) in an idle mode.

Figure 4:
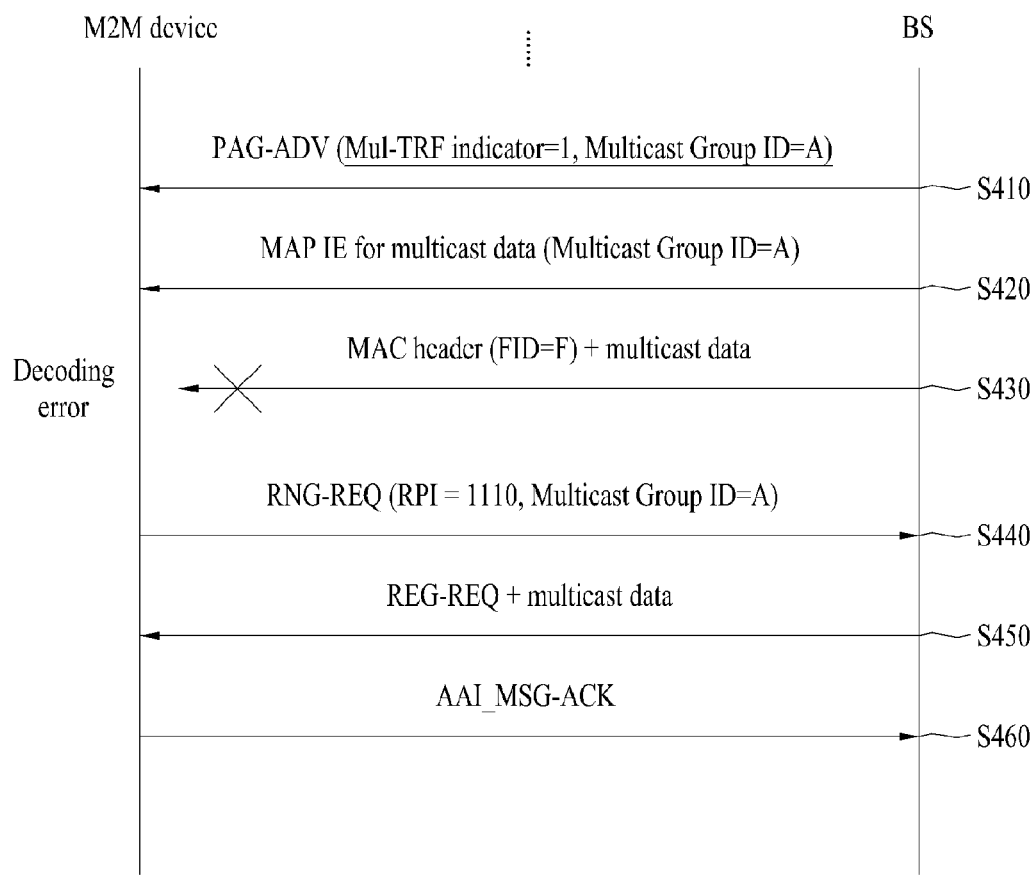
FIG. 4 is a view illustrating an example of a process for receiving multicast data at an M2M device in idle mode.

FIG. 4 is a view illustrating an example of a process for receiving multicast data at an M2M device in idle mode.

Referring to FIG. 4, a BS may transmit a paging message (e.g. a PAG-ADV or AAI-PAG-ADV message) to an M2M device in idle mode (S410). The paging message includes a multicast traffic indicator (Mul-TRF indicator=1) indicating that multicast data is transmitted and multicast group ID information (e.g. a multicast group ID (or M2M Group ID (MGID))=A). The processor 120 of an M2M device checks whether the multicast group ID included in the paging message corresponds thereto and decodes the paging message. The BS may transmit control information for multicast data transmission (e.g. a multicast MAP IE or multicast A-MAP IE) to the M2M device (S420). Next, the BS may transmit the multicast data and a MAC header (Flow ID (FID)=F) to the M2M device (S430).

When the M2M device receives a multicast data burst in idle mode, if the processor 120 of the M2M device fails to decode the burst (S430), the M2M device may perform a location update procedure for receiving the multicast data. At this time, the M2M device may transmit a ranging request message (e.g. an AAI-RNG-REQ message) to the BS (S440) and the ranging request message may include information about a Ranging Purpose Indication (RPI) and a multicast group ID. If the RPI in the ranging request message is set to, for example, 1110, this may indicate that the ranging request message is for location update for multicast data reception (or multicast data retransmission request).

Upon receiving the ranging request message in which the RPI indicates location update for multicast data reception (or multicast data retransmission request) from the M2M device (S440), the BS may retransmit corresponding multicast data to the M2M device with reference to the multicast group ID included in the ranging request message (S450). In this case, the BS may transmit the multicast data to the M2M device through a ranging response message (S450). Next, the M2M device may transmit an ACK message (e.g. MSG-ACK message) for the ranging response message to the BS (S460). If the ACK message for the ranging response message is not received from the M2M device after an ACK time, the BS may retransmit the multicast data to the M2M device until the ACK message is re-received from the M2M device.

Figure 5:
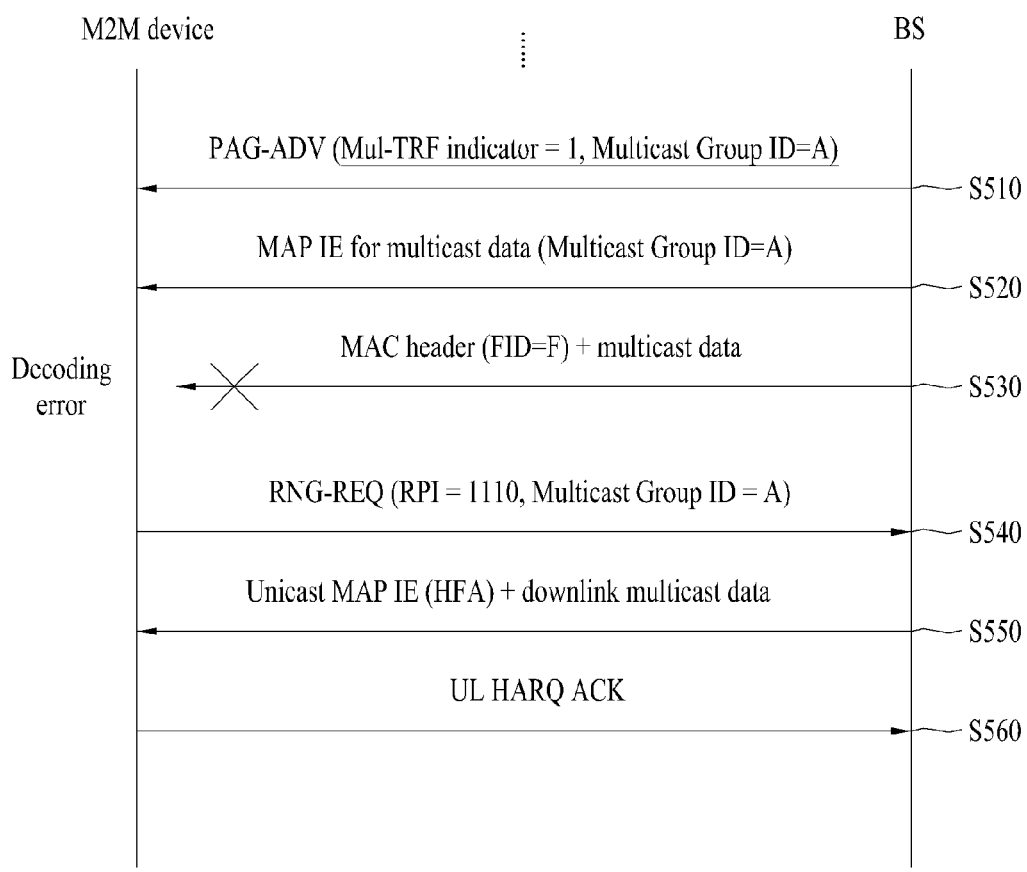
FIG. 5 is a view illustrating another example of a process for receiving multicast data at an M2M device in idle mode.

FIG. 5 is a view illustrating another example of a process for receiving multicast data at an M2M device in idle mode.

In the illustrated case of FIG. 5, the M2M device in idle mode receives multicast data using a unicast scheme without network reentry. Referring to FIG. 5, a BS may transmit a paging message (e.g. a PAG-ADV or AAI-PAG-ADV message) to an M2M device which is operating in idle mode in the same manner as in FIG. 4 (S510). The paging message includes a multicast traffic indicator (Mul-TRF indicator=1 or action code=0b10 (receiving multicast traffic)) indicating that multicast data is transmitted and multicast group ID information (e.g. multicast group ID=A). The processor 120 of the M2M device checks whether the multicast group ID included in the paging message corresponds thereto and decodes the paging message. The BS may transmit control information for multicast data transmission (e.g. a multicast MAP IE or multicast A-MAP IE) to the M2M device (S520). Next, the BS may transmit the multicast data and a MAC header (FID=F) to the M2M device (S530).

When the M2M device receives a multicast data burst in idle mode, if the processor 120 of the M2M device fails to decode the burst (S530), the M2M device may perform a location update procedure for receiving the multicast data. At this time, the M2M device does not perform a network reentry procedure.

The M2M device may transmit a ranging request message (e.g. an AAI-RNG-REQ message) to the BS without performing the network reentry procedure (S540) and the ranging request message may include RPI information and multicast group ID information. If an RPI in the ranging request message is set to, for example, 1110, this may indicate that the ranging request message is for location update for multicast data reception.

Upon receiving the ranging request message indicating location update for multicast data reception (or multicast data retransmission request) from the M2M device (S540), the BS may retransmit corresponding multicast data to the M2M device with reference to the multicast group ID included in the ranging request message (S550). In this case, the BS may transmit the multicast data to the M2M device without transmitting a ranging response message (S550). That is, transmission of the multicast data is used as ACK for the ranging request message. In this case, the BS may transmit information about HARQ Feedback Allocation (HFA) for the multicast data to the M2M device together with the multicast data (S550). The information about HFA may be transmitted in the form of unicast control information. Upon successfully decoding the received multicast data in step S550, the M2M device may transmit an uplink HACK ACK signal to the BS (S560).

Figure 6:
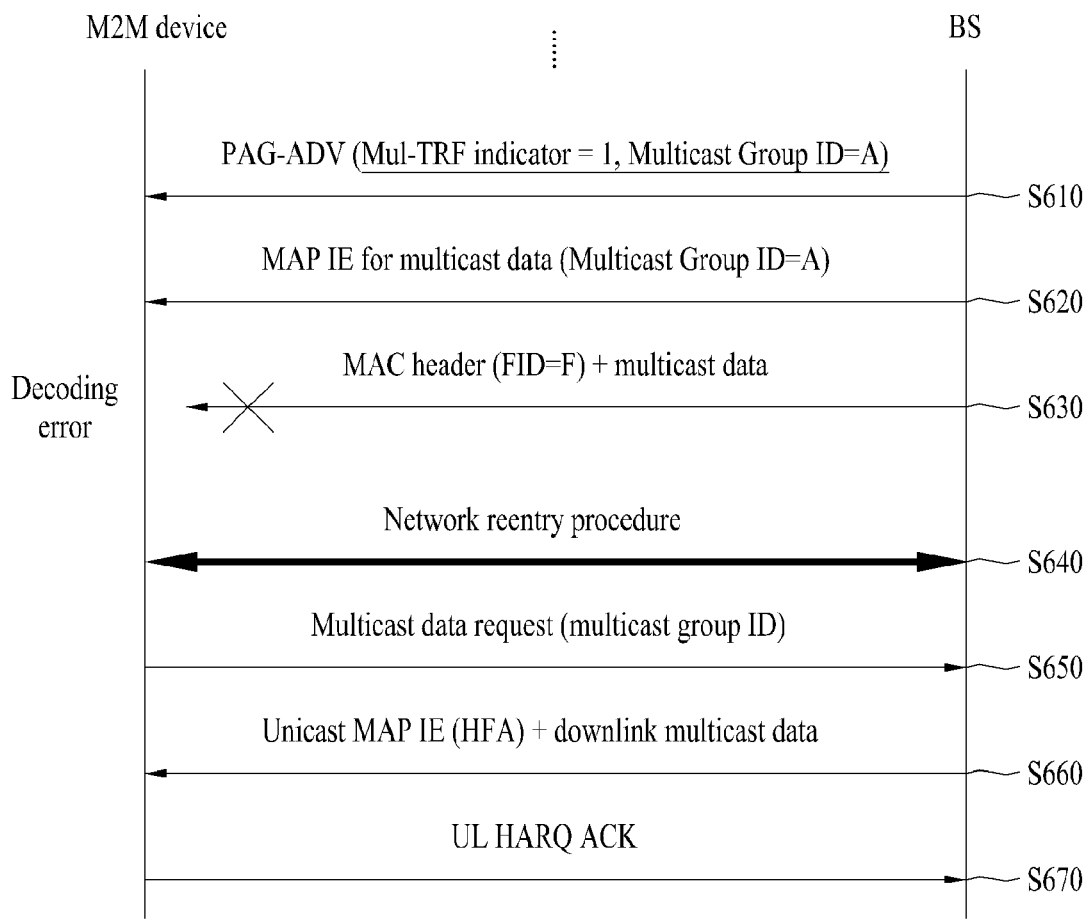
FIG. 6 is a view illustrating still another example of a process for receiving multicast data at an M2M device in idle mode.

FIG. 6 is a view illustrating still another example of a process for receiving multicast data at an M2M device in idle mode.

In the illustrated case of FIG. 6, the M2M device in idle mode receives multicast data using a unicast scheme by reentering a network. Referring to FIG. 6, a BS may transmit a paging message (e.g. a PAG-ADV or AAI-PAG-ADV message) to an M2M device which is operating in idle mode (S610). The paging message includes a multicast traffic indicator (Mul-TRF indicator=1) indicating that multicast data is transmitted and multicast group ID information (e.g. a multicast group ID=A). The processor 120 of the M2M device checks whether the multicast group ID included in the paging message corresponds thereto and decodes the paging message. The BS may transmit control information for multicast data transmission (e.g. a multicast MAP IE or multicast A-MAP IE) to the M2M device (S620). Next, the BS may transmit the multicast data and a MAC header (FID=F) to the M2M device (S630).

If the processor 120 of the M2M device fails to decode a multicast data burst despite reception of the burst in idle mode (S630), the M2M device may perform a location update procedure for receiving the multicast data. At this time, the M2M device may perform a network reentry procedure with the BS (S640).

The M2M device may transmit a multicast data request message including a multicast group ID to the BS (S650). As a response to the multicast data request message, the BS may retransmit corresponding multicast data to the M2M device with reference to a multicast group ID, an FID, etc. included in the multicast data request message (S660). In this case, the BS may transmit information about HFA for the multicast data to the M2M device together with the multicast data (S660). The information about HFA may be transmitted in the form of unicast control information. Upon successfully decoding the received multicast data in step S660, the M2M device may transmit an uplink HACK ACK signal to the BS (S670).

Figure 7:
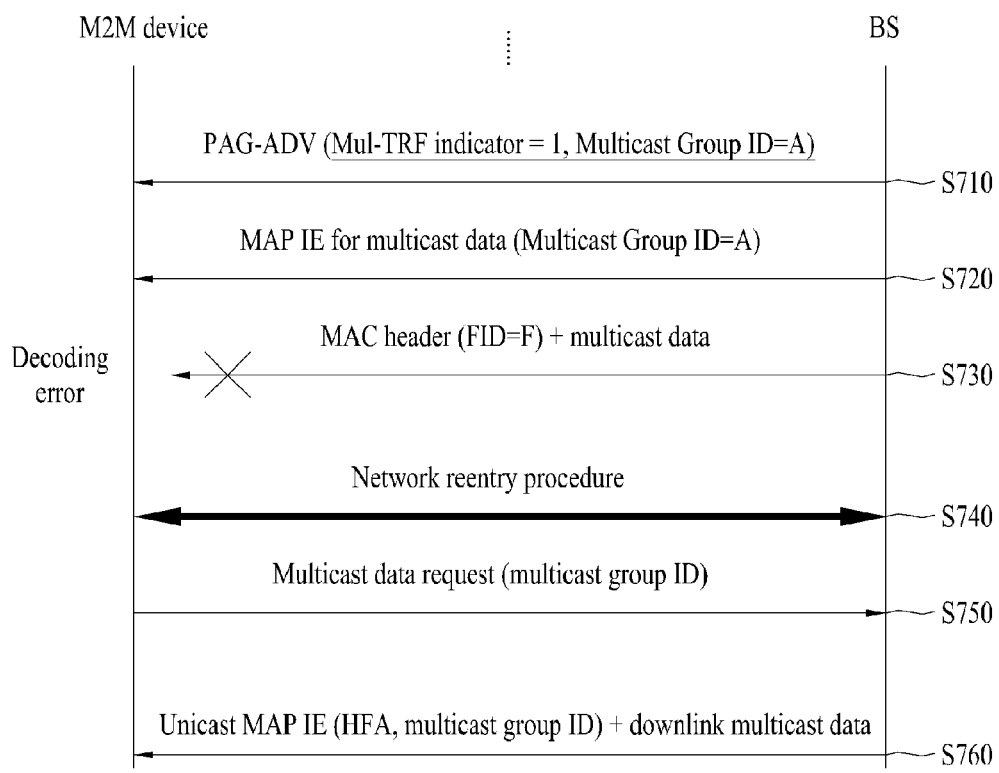
FIG. 7 is a view illustrating another example of a process for receiving multicast data at an M2M device in an idle mode.

FIG. 7 is a view illustrating another example of a process for receiving multicast data at an M2M device in an idle mode.

In the illustrated case of FIG. 7, the M2M device in idle mode receives multicast data using a multicast scheme rather than a unicast scheme by reentering a network. Referring to FIG. 7, a BS may transmit a paging message (e.g. a PAG-ADV or AAI-PAG-ADV message) to an M2M device which is operating in idle mode (S710). The paging message includes a multicast traffic indicator (Mul-TRF indicator=1) indicating that multicast data is transmitted and multicast group ID information (e.g. a multicast group ID=A). The processor 120 of the M2M device checks whether a multicast group ID included in the paging message corresponds thereto and decodes the paging message. The BS may transmit control information for multicast data transmission (e.g. a multicast MAP IE or multicast A-MAP IE) to the M2M device (S720). Next, the BS may transmit the multicast data and a MAC header (FID=F) to the M2M device (S730).

If the processor 120 of the M2M device fails to decode a multicast data burst despite reception of the burst in idle mode (S730), the M2M device may perform a location update procedure for receiving the multicast data. At this time, the M2M device may perform a network reentry procedure with the BS (S740).

The M2M device may transmit a multicast data request message including the multicast group ID to the BS (S750). As a response to the multicast data request message, the BS may transmit control information for multicast data transmission and downlink multicast data to the M2M device (S760). The control information for multicast transmission (e.g. multicast A-MAP IE) may include information about the multicast group ID and HFA. The processor 120 of the M2M device may decode a multicast group ID field to confirm that the multicast group ID corresponds thereto and may decode an HFA information field to obtain HFA information allocated thereto. The processor 120 of the M2M device may also decode the downlink multicast data.

Up to now, methods for providing reliability during multicast transmission have been described. Although the above methods may be used for the BS to reliably transmit multicast data to M2M devices, unnecessary power consumption and resource waste caused by feedback transmission of the M2M devices may occur. Accordingly, methods by which the BS can control unnecessary power and resources will be described. Namely, if the BS desires to reliably provide specific multicast traffic, the BS may inform the M2M device that corresponding traffic is reliable while transmitting the multicast traffic. Only when a reliable transmission indicator is set to 1, the BS may reliably transmit the multicast traffic to the M2M device using one of the above methods (e.g. multicast retransmission methods using an ACK channel, retransmission without feedback, a shared NACK channel, a unicast scheme, etc.) with respect to a corresponding packet.

The following Table 5 shows an example of a multicast control information message (e.g. a multicast MAP IE message) including shared NACK channel information.

TABLE 5

| Syntax | Size | Value | Condition |
|---|---|---|---|
| Multicast Group ID | 15 | | |
| Burst size | 6 | Burst size as indicated in the first 39 entries in Table 958 | |
| Resource index | 11 | 5 MHz: 0 in first 2 MSB bits + 9 bits for resource index | |

TABLE 5-continued

| Syntax | Size | Value | Condition |
|---|---|---|---|
| | | 10 MHz: 11 bits for resource index<br>20 MHz: 11 bits for resource index<br>Resource index includes location and allocation size. | |
| Long TTI Indicator | 1 | Indicates number of AAI subframes spanned by the allocated resource.<br>0b0: 1 AAI subframe (default TTI)<br>0b1: 4 DL AAI subframes for FDD or all DL AAI subframes for TDD (long TTI) | |
| Reliable transmission indicator | 1 | Indicates that corresponding multicast traffic is reliably transmitted. In this case, shared NACK channel is included in this MAP. | |
| If (Reliable transmission indicator ==1) { | | | |
|   Shared NACK channel | 4 | Indicates location of UL shared NACK channel | |
|   SPID | 2 | Subpacket ID | |
|   Tx.No | 2 | Number of transmissions of same burst<br>00: Indicates that transmission of same burst is first transmission<br>01: Indicates that transmission of same burst is second transmission<br>10: Indicates that transmission of same burst is third transmission<br>11: Indicates that transmission of same burst is last transmission | |
| } | | | |
| ... | ... ... | | ... |

Referring to Table 5, a multicast MAP IE message format may include a burst size field, a resource index field, a long TTI indicator field, and a reliable transmission indicator field indicating whether corresponding multicast traffic is reliably transmitted. If the reliable transmission indicator field (or a reliable multicast transmission field) indicates that the multicast traffic is reliably transmitted, the multicast MAP IE message format may further include a shared NACK channel field, an SPID field, and a number-of-transmissions (Tx.No) field indicating how many transmissions are performed with respect to the same burst.

If the processor 120 of the M2M device confirms that the reliable transmission indicator field indicates that the multicast traffic is reliably transmitted (reliable transmission indicator is set to 1), the processor 120 of the M2M device may decode the shared NACK channel field to obtain the location of an uplink shared NACK channel and may decode the SPID field to obtain an SPID of corresponding multicast traffic. The processor 120 of the M2M device may also decode the number-of-transmissions (Tx.No) field to identify how many times multicast traffic is transmitted.

Even when the retransmission request method using a unicast method (e.g. a location update procedure) as described in the eighth embodiment of the present invention is used, the multicast MAP IE message format may include the SPID field and the number-of-transmissions field.

The following Table 6 shows another example of the multicast control information message (e.g. multicast MAP IE message).

TABLE 6

| Syntax | Size | Value | Condition |
|---|---|---|---|
| Multicast Group ID | 15 | | |
| Burst size | 6 | Burst size as indicated in the first 39 entries in Table 958 | |
| Resource index | 11 | 5 MHz: 0 in first 2 MSB bits + 9 bits for resource index<br>10 MHz: 11 bits for resource index<br>20 MHz: 11 bits for resource index<br>Resource index includes location and allocation size. | |
| Long TTI Indicator | 1 | Indicates number of AAI subframes spanned by the allocated resource.<br>0b0: 1 AAI subframe (default TTI)<br>0b1: 4 DL AAI subframes for FDD or all DL AAI subframes for TDD (long TTI) | |
| Reliable transmission indicator | 1 | Indicates that corresponding multicast traffic is reliably transmitted. | |
| If (Reliable transmission indicator ==1) { | | | |
|   SPID | 2 | Subpacket ID | |

TABLE 6-continued

| Syntax | Size | Value | Condition |
|---|---|---|---|
| Tx.No | 2 | Number of transmissions of same burst<br>00: Indicates that transmission of same burst is first transmission<br>01: Indicates that transmission of same burst is second transmission<br>10: Indicates that transmission of same burst is third transmission<br>11: Indicates that transmission of same burst is last transmission | |
| } | | | |
| ... | ... ... | | ... |

Referring to Table 6, a multicast MAP IE message format may include a burst size field, a resource index field, a long TTI indicator field, and a reliable transmission indicator field indicating whether corresponding multicast traffic is reliably transmitted. If the reliable transmission indicator field (or a reliable multicast transmission field) indicates that the multicast traffic is reliably transmitted, the multicast MAP IE message format may further include an SPID field indicating an SPID and a number-of-transmissions (Tx.No) field indicating how many transmissions are performed with respect to the same burst.

If the processor 120 of the M2M device confirms that the reliable transmission indicator field indicates that the multicast traffic is reliably transmitted (reliable transmission indicator is set to 1), the processor 120 of the M2M device may decode the SPID field to obtain an SPID of the multicast traffic. The processor 120 of the M2M device may also decode the number-of-transmissions (Tx.No) field to identify how many times the multicast traffic is transmitted.

Although the BS may activate reliable multicast transmission for corresponding traffic as shown in Tables 5 and 6 while transmitting multicast traffic, reliable multicast transmission may be activated when multicast connection is established. For example, upon allocating a multicast group ID and a multicast FID to an M2M device through a DSA process, the BS may inform the M2M device of a DSA message including a reliable multicast transmission indicator to notify the M2M device whether corresponding connection provides reliable transmission.

If the reliable multicast transmission indicator is set to 1 to indicate that reliable multicast traffic is transmitted, the BS provides the reliable multicast traffic to the M2M device upon transmitting traffic for the corresponding connection. This is applicable to connection corresponding to the multicast group ID and FID.

If the multicast group ID is allocated during initial network reentry of the M2M device, the BS may set a value indicating whether the multicast group ID permits reliable multicast transmission when allocating the multicast group ID to the M2M device. If reliable multicast transmission is permitted, the corresponding indicator may be set to 1. In this case, the M2M device may inform the BS of an ACK signal indicating whether the multicast traffic has been successfully received, using one of the methods defined in the above various embodiments of the present invention.

Tenth Embodiment

The tenth embodiment of the present invention relates to a method for providing reliability through NACK based MAC level feedback after N retransmissions without feedback. Multicast control information according to the tenth embodiment may be transmitted in the form of a broadcast assignment A-MAP IE as shown in Table 7.

TABLE 7

| Syntax | Size | Value | Condition |
|---|---|---|---|
| A-MAP IE Type | 4 | Broadcast Assignment A-MAP IE | A-MAP IE Type |
| Function Index | 2 | 0b00: This IE carries broadcast assignment information<br>0b01: This IE carries handover ranging channel allocation information<br>0b10: This IE carries multicast assignment information<br>0b11: This IE carries multicast assignment information for M2M Group identified by M2M Group Identifier (see 16.2.1.3.1) | |
| if {Function Index == 0b00} { | | | |
| ... | ... ... | | ... |
| }else if {Function Index == 0b11} { | | | |
| M2M Group ID (MGID) | 15 | | |
| Burst size | 6 | Burst size as indicated in the first 39 entries in Table 958 | |
| Resource index | 11 | 5 MHz: 0 in first 2 MSB bits + 9 bits for resource index<br>10 MHz: 11 bits for resource index<br>20 MHz: 11 bits for resource index<br>Resource index includes location and allocation size. | |

TABLE 7-continued

| Syntax | Size | Value | Condition |
|---|---|---|---|
| Long TTI Indicator | 1 | Indicates number of AAI subframes spanned by the allocated resource.<br>0b0: 1 AAI subframe (default TTI)<br>0b1: 4 DL AAI subframes for FDD or all DL AAI subframes for TDD (long TTI) | |
| Retransmission indicator | 1 | Indicates whether same burst is retransmitted in next frame.<br>0: Non-retransmission<br>1: Transmission of same burst in next frame | |
| } | | | |

Referring to Table 7, a broadcast assignment A-MAP IE message may include an A-MAP IE type field indicating the type of the message and a function index field indicating the function of the message. If the function index field of the message indicates multicast assignment information for an M2M group, the message may include an MGID field, a burst size field, a resource index field, a long TTI indicator field, a retransmission indicator field, etc. In the broadcast assignment A-MAP IE, if a function index is set to 0b11, this indicates that a corresponding MAP includes assignment information for multicast data transmission for an M2M group indicated by an MGID.

Figure 8A:
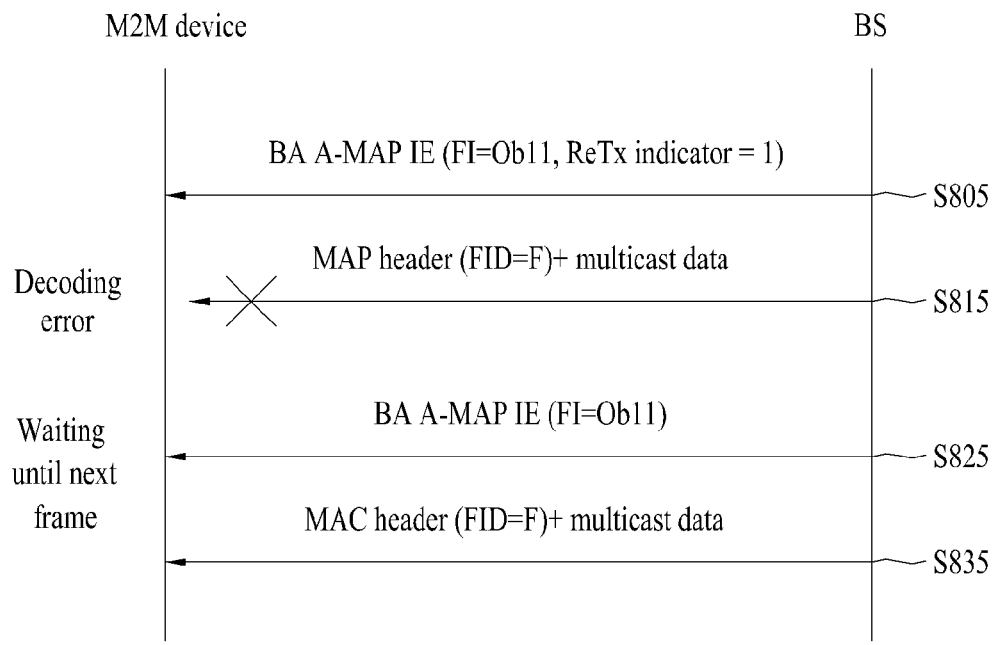
FIGS. 8A and 8B are views illustrating examples of a multicast data reception method of an M2M device according to a retransmission indicator value in Table 7.
Figure 8B:
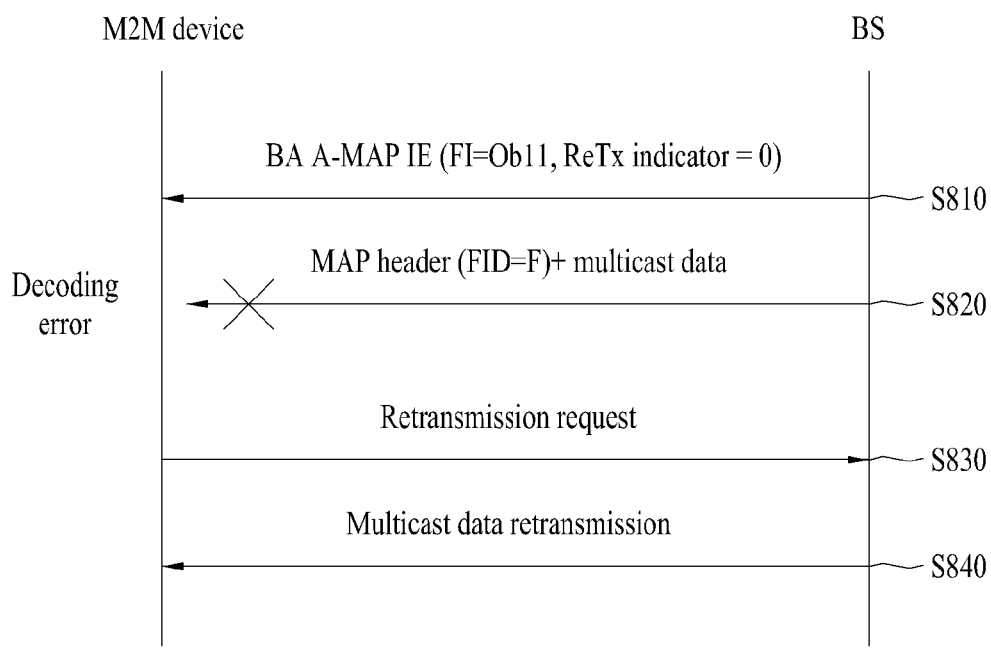

FIGS. 8A and 8B are views illustrating examples of a multicast data reception method of an M2M device according to a retransmission indicator value in Table 7.

Referring to FIG. 8A, the M2M device may receive a broadcast assignment A-MAP IE message including a function index field indicating multicast assignment information for an M2M group from a BS (S805). The broadcast assignment A-MAP IE message may include a retransmission indicator field indicating that multicast data is retransmitted (retransmission (ReTx) indicator=1). Next, the M2M device may receive a MAC header (FID=F) and the multicast data from the BS (S815). If the processor 120 of the M2M device fails to decode the multicast data, the M2M device waits until the next time unit (e.g. the next frame). Thereafter, the M2M device may re-receive the broadcast assignment A-MAP IE message including the function index field indicating the multicast assignment information for the M2M group (S825). The M2M device may successfully receive the MAC header (FID=F) and multicast data from the BS (S835).

In this way, if a 1-bit retransmission indicator of the broadcast assignment A-MAP IE indicates whether retransmission is performed in the next time unit (e.g. the next frame), the number of retransmissions performed even without a retransmission request of the M2M device (i.e. unsolicited retransmission of a burst) may be restricted to one in order to prevent a complicated error caused by loss in the A-MAP IE. For example, if the retransmission indicator is set to 1 in a current time unit (e.g. current frame #N), the retransmission indicator will be set to 0 in the next time unit (e.g. next frame #N+1).

Therefore, although the M2M device has received the broadcast assignment A-MAP IE in which the retransmission indicator is set to 1 and has not received the broadcast assignment A-MAP IE in the next time unit (e.g. next frame #N+1), if the retransmission indicator in the broadcast assignment A-MAP IE transmitted in frame #N+2 is set to 1, the M2M device may determine the corresponding broadcast assignment A-MAP IE as a MAP for a new burst.

Referring to FIG. 8b, the M2M device may receive a broadcast assignment A-MAP IE message including a function index field indicating multicast assignment information for an M2M group and a retransmission indicator field indicating whether multicast data is retransmitted (here, ReTx indicator=0 indicating non-retransmission) from a BS (S810). Next, the M2M device may receive a MAC header (FID=F) and the multicast data from the BS (S820). If the processor 120 of the M2M device fails to decode the multicast data, the M2M device may request that the BS retransmit the multicast data (S830). The retransmission request method of the M2M device may use the above defined methods. That is, an M2M device in connected mode may transmit an M2M retransmission request message (e.g. an AAI-REQ message) to the BS and an M2M device in idle mode may transmit a ranging request message (e.g. AAI-RNG-REQ message) (i.e. using a location update procedure) to the BS, thereby requesting that the BS retransmit the multicast data. Next, the M2M device may successfully receive the multicast data retransmitted from the BS (S840).

To reduce the number of retransmission requests from the M2M device to the BS, the M2M device may not request retransmission even when the retransmission indicator is set to 0. Such a specific burst requires guarantee of lower reliability than other bursts. A corrected broadcast assignment A-MAP IE message format for supporting the specific burst is shown in Table 8.

TABLE 8

| Syntax | Size | Value | Condition |
|---|---|---|---|
| A-MAP IE Type | 4 | Broadcast Assignment A-MAP IE | A-MAP IE Type |
| Function Index | 2 | 0b00: This IE carries broadcast assignment information<br>0b01: This IE carries handover ranging channel allocation information<br>0b10: This IE carries multicast assignment information<br>0b11: This IE carries multicast assignment information for M2M Group identified by M2M Group Identifier (see 16.2.1.3.1) | |

TABLE 8-continued

| Syntax | Size | Value | Condition |
| --- | --- | --- | --- |
| if {Function Index == 0b00} { | | | |
| ... | ... | ... | ... |
| }else if {Function Index == 0b11} { | | | |
| M2M Group ID (MGID) | 15 | | |
| Burst size | 5 | Burst size as indicated in the first 32 entries in Table 958 | |
| Resource index | 11 | 5 MHz: 0 in first 2 MSB bits + 9 bits for resource index<br>10 MHz: 11 bits for resource index<br>20 MHz: 11 bits for resource index<br>Resource index includes location and allocation size. | |
| Long TTI Indicator | 1 | Indicates number of AAI subframes spanned by the allocated resource.<br>0b0: 1 AAI subframe (default TTI)<br>0b1: 4 DL AAI subframes for FDD or all DL AAI subframes for TDD (long TTI) | |
| Retransmission indicator | 1 | Indicates whether same burst is retransmitted in next frame.<br>0: Non-retransmission<br>1: Transmission of same burst in next frame | |
| ReTx-REQ indicator | 1 | Retransmission request indicator<br>Indicates whether to request retransmission when M2M device fails to decode corresponding burst.<br>M2M device requests retransmission upon failing to decoding burst only when ReTx-REQ indicator is set to 1.<br>When retransmission indicator is set to 1, ReTx-REQ indicator will be set to always 0. | |
| } | | | |

Referring to Table 8, a burst size field for multicast data is changed to 5 bits from 6 bits as opposed to Table 7 in order to further include a retransmission request indicator (ReTx-REQ) field in a broadcast assignment A-MAP IE. Accordingly, only 32 entries among a total of 39 entries of burst size may be used. In the above Table 8, the first 32 entries of the bust size among 39 entries are defined to be used. However, the last 32 entries or middle 32 entries of the burst size (e.g. from index 3 to index 35) may be used as an alternative method.

Figure 9A:
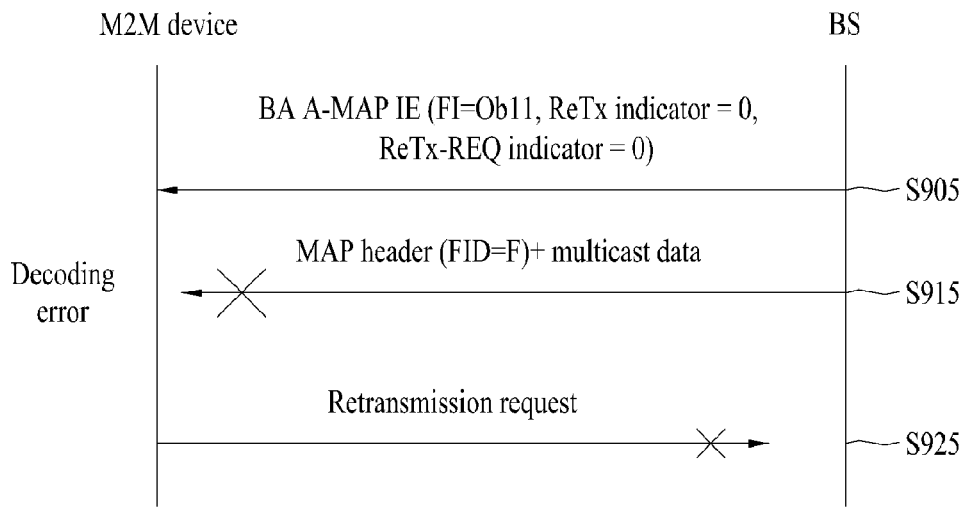
FIGS. 9A and 9B are views illustrating examples of a multicast data reception method of an M2M device when a retransmission indicator value is 0.
Figure 9B:
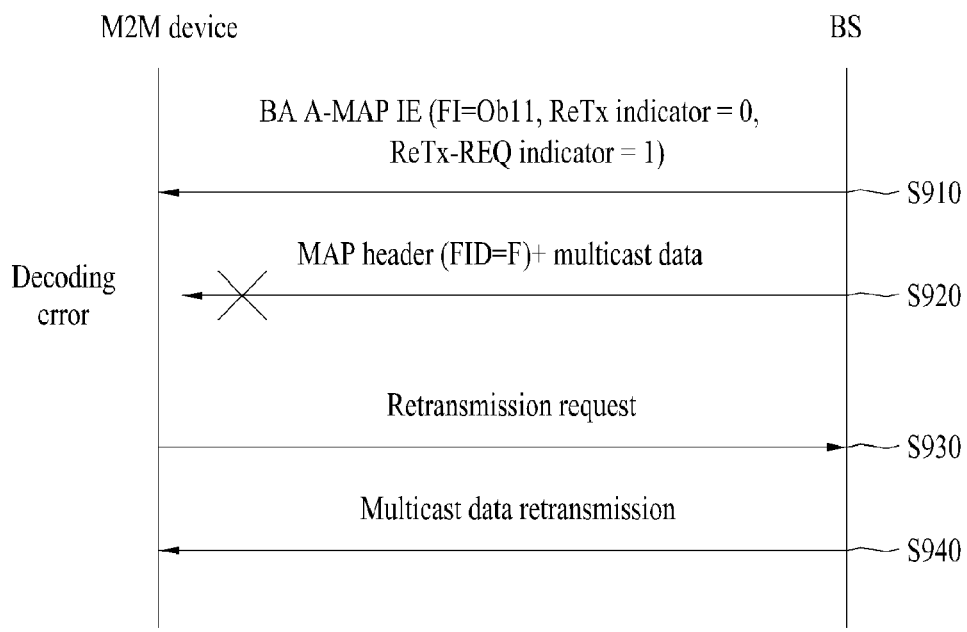

FIGS. 9A and 9B are views illustrating examples of a multicast data reception method of an M2M device when a retransmission indicator value is 0.

Referring to FIG. 9A, an M2M device may receive a broadcast assignment A-MAP IE message including a function index field indicating multicast assignment information for an M2M group from a BS (S905). The broadcast assignment A-MAP IE message may also include a retransmission indicator field and a retransmission request indicator field. In this case, the retransmission request indicator field may be set to 0 and the retransmission indicator field may be set to 0 to indicate that multicast data is not retransmitted. Next, the M2M device may fail to successfully decode the multicast data although a MAC header (FID=F) and the multicast data have been received from the BS (S915). Even if the M2M device fails to successfully decode the multicast data, the M2M device does not request retransmission of the multicast data (S925). That is, even though the retransmission indicator is set to 0, if the retransmission request indicator is set to 0, the M2M device does not request retransmission despite failure to decode the multicast data.

Referring to FIG. 9B, an M2M device may receive a broadcast assignment A-MAP IE message including a function index field indicating multicast assignment information for an M2M group from a BS (S910). The broadcast assignment A-MAP IE message may also include a retransmission indicator field and a retransmission request indicator field. In this case, the retransmission request indicator field may be set to 1 and the retransmission indicator field may be set to 0 to indicate that multicast data is not retransmitted. Next, the M2M device may fail to successfully decode the multicast data although a MAC header (FID=F) and the multicast data the BS have been received from (S920). In a situation in which the retransmission request indicator field is set to 1 and the retransmission indicator is set to 0 to indicate that the multicast data is not retransmitted, the M2M device may request that the BS retransmit the multicast data (S930). As a response to the retransmission request, the BS may retransmit the multicast data to the M2M device (S940).

Eleventh Embodiment

The eleventh embodiment of the present invention relates to events considered by the M2M device as a multicast data reception error.

In a multicast data retransmission request of the M2M device using a unicast method in the above eighth embodiment, the M2M device may request that the BS retransmit the multicast data in a situation in which errors are sensed as follows. The M2M device may consider events of the following cases regarded as a multicast data reception error.

Case 1: Downlink Burst Decoding Error (by CRC)

(1) In the case in which a data burst is received when there is no unsolicited retransmission of the BS, the processor 120 of the M2M device may judge that a downlink burst decoding error has occurred.

(2) The processor 120 of the M2M device judges that an error has occurred and requests that the BS retransmit a burst, only when a burst decoding error occurs in a situation in which there is unsolicited retransmission of the BS (i.e. a multicast MAP IE (or a broadcast assignment A-MAP IE for M2M multicast) includes a retransmission indicator) and the retransmission indicator is set to 0 (indicating that a corresponding burst is not retransmitted next).

(3) The processor 120 of the M2M device judges that an error has occurred and requests that the BS retransmit a burst only when a burst decoding error occurs in a situation in which the retransmission indicator is set to 0 in a MAP, the MAP includes a Retransmission Request Indicator (RII), and the corresponding indicator (RII) is set to 1 (i.e. a retransmission request of the corresponding burst at the M2M device is supported).

Case 2: Out-of-Order Delivery (by Checking a MAC Protocol Data Unit (MPDU) Sequence Number)

(1) The M2M device may immediately request that the BS retransmit a burst upon confirming out-of-order delivery. In this case, the M2M device may transmit a retransmission request message including a missed MPDU sequence number.

(2) Upon detecting out-of-order delivery (i.e. a PDU corresponding to Sequence Number (SN) #N arrives at the receiver 112 before a PDU corresponding to SN #N−1 arrives), the M2M device starts a Multicast Error Detection (MED) timer $T_{MED}$ and waits for arrival of an SN N#−1 PDU until the MED timer $T_{MED}$ ends. If the M2M device receives the SN #N−1 PDU before the MED timer ends, the SN #N−1 PDU stops the MED timer. If the MED timer ends, the processor 120 of the M2M device judges that an error has occurred and may request that the BS retransmit a burst. In this case, the M2M device transmits a retransmission request message including missed MPDU SN information.

(3) Upon receiving an MPDU, if the received MPDU has the same SN as a previously received MPDU, the M2M device discards the corresponding MPDU.

Case 3: When a Multicast Inter-Arrival (MIA) Timer Ends

The M2M device starts an MIA timer upon receiving first multicast data and stops the MIA timer upon receiving a multicast transmission end indicator (e.g. Multicast Transmission End Extension Header (MTEEH)) from the BS. Whenever multicast data for the same group or connection is received, the MIA timer is reset. If the MIA timer ends, the processor 120 of the M2M device judges that an error has occurred and may request that the BS retransmit the multicast data. In this case, the processor 120 of the M2M device may transmit a message including a last successfully received MPDU SN.

Case 4. When a Multicast Transmission Start Time (MTST) is Included in a Paging Message and the M2M Device has not Received Scheduling Information about Multicast Data (e.g. MAP) at an MTST.

(1) If an idle-mode M2M device has not received a multicast MAP IE in a frame indicated by an MTST, the M2M device may request that the BS retransmit the multicast MAP IE.

(2) Upon receiving a paging message including a multicast traffic indicator, the idle-mode M2M device starts an MIA timer and, whenever multicast data is successfully received, the idle-mode M2M device resets the MIA timer. If an MTST is included in a paging message, the MIA timer is reset at the MTST. If an MTEEH is received, the MIA timer ends. When the MIA timer ends, the processor 120 of the M2M device judges that an error has occurred and may request that the BS retransmit the multicast data.

If the BS retransmits the multicast data when necessary, the BS may inform the M2M device whether the multicast data is retransmitted through a new data indicator instead of a retransmission indicator indicating whether the multicast data is retransmitted in the next time unit (e.g. the next frame). The new data indicator may be included in a broadcast assignment A-MAP IE shown in Table 9.

TABLE 9

| Syntax | Size | Value | Condition |
| --- | --- | --- | --- |
| A-MAP IE Type | 4 | Broadcast Assignment A-MAP IE | A-MAP IE Type |
| Function Index | 2 | 0b00: This IE carries broadcast assignment information<br>0b01: This IE carries handover ranging channel allocation information<br>0b10: This IE carries multicast assignment information<br>0b11: This IE carries multicast assignment information for M2M Group identified by M2M Group Identifier (see 16.2.1.3.1) | |
| if {Function Index == 0b00} { | | | |
| ... | ... ... | | ... |
| }else if {Function Index == 0b11} { | | | |
| M2M Group ID (MGID) | 15 | | |
| Burst size | 6 | Burst size as indicated in the first 39 entries in Table 958 | |
| Resource index | 11 | 5 MHz: 0 in first 2 MSB bits + 9 bits for resource index<br>10 MHz: 11 bits for resource index<br>20 MHz: 11 bits for resource index<br>Resource index includes location and allocation size. | |
| Long TTI Indicator | 1 | Indicates number of AAI subframes spanned by the allocated resource.<br>0b0: 1 AAI subframe (default TTI)<br>0b1: 4 DL AAI subframes for FDD or all DL AAI subframes for TDD (long TTI) | |

TABLE 9-continued

| Syntax | Size | Value | Condition |
| --- | --- | --- | --- |
| New data indicator | 1 | Indicates whether current curst is new or not.<br>0: Currently transmitted burst indicates retransmitted burst<br>1: Currently transmitted burst indicates new burst | |
| } | | | |

Referring to Table 9, a broadcast assignment A-MAP IE may include a function index field indicating multicast assignment information for an M2M group and include a new data indicator field. If the new data indicator field is set to 1, the processor 120 of the M2M device judges that multicast data may be retransmitted in the next time unit (e.g. the next frame) and checks whether the same burst is retransmitted (new data indicator=0) until the next time unit (e.g. the next frame). If the same burst is retransmitted in the next time unit (e.g. the next frame), the processor 120 of the M2M device receives a retransmitted burst. If the same burst is not retransmitted in the next time unit (e.g. the next frame), an idle-mode M2M device may request that the BS retransmit the burst by transmitting a ranging request message (e.g. AAI-RNG-REQ message) and a connected-mode M2M device may request that the BS retransmit the burst by transmitting an AAI-MMR-REQ message. This method may use the above Case 1.

The BS may transmit multicast data (multicast burst) only one time. In the case in which the M2M device fails to decode the multicast burst, if the decoding-failed multicast burst is a new burst (Burst Indicator (BI)=0), the processor 120 of the M2M device may wait for the multicast burst to be received until the next frame. If the multicast burst is a retransmitted burst (BI=1), the M2M device should transmit MAC level feedback to the BS.

When an MPDU arrives out of sequence (e.g. the M2M device receives an MPDU of SN #N before receiving an MPDU of SN #N−1), the processor 120 of the device may start an MED timer $T_{MED}$. The MED timer $T_{MED}$ stops if the M2M device receives a missed MPDU before $T_{MED}$ expires. If $T_{MED}$ expires, the M2M device transmits MAC level feedback to the BS.

When the processor 120 of the M2M device in connected mode receives first multicast data, an MIA timer $T_{MIA}$ starts. When the M2M device in idle mode receives a paging message indicating that there is multicast traffic for an M2M group to which the M2M device belongs, the MIA timer $T_{MIA}$ starts.

$T_{MIA}$ is reset whenever the M2M device receives multicast data. $T_{MIA}$ stops when the M2M device receives an MTEEH. If the timer $T_{MIA}$ expires, the M2M device transmits MAC level feedback to inform the BS of an error state. For MAC level feedback, the M2M device needs to transmit an M2M multicast retransmission request message (e.g. AAI-MMR-REQ message) in the connected mode and transmit a ranging request message (e.g. AAI-RNG-REQ message (i.e. a location update procedure)) in the idle mode. Each of the AAI-MMR-REQ message and AAI-RNG-REQ message may include an M2M Group ID (MGID) field, a MAP transmission time field, a field indicating SNs of missed MPDUs, and a field indicating an SN of the last successfully received MPDU.

Upon receiving the AAI-MMR-REQ message from the M2M device, the BS should retransmit the missed multicast data to the M2M device. Upon receiving the AAI-RNG-REQ message including multicast MAC level feedback information from the M2M device, the BS should transmit an AAI-REQ-RSP message and retransmit the missed multicast data to the M2M device.

The following Table 10 shows an example of a broadcast assignment A-MAP IE message format according to the present invention.

TABLE 10

| Syntax | Size (bit) | Notes |
| --- | --- | --- |
| Broadcast_Assignment_AMAP_IE( ) | | |
| { | | |
| A-MAP IE Type | 4 | Broadcast Assignment A-MAP IE |
| Function Index | 2 | 0b00: This IE carries broadcast assignment information<br>0b01: This IE carries handover ranging channel allocation information<br>0b10: This IE carries multicast assignment information<br>0b11: This IE carries multicast assignment information for M2M application |
| ... | ... | ... |
| } else if {Function Index == 0b10} { | | |
| ... | ... | ... |
| } | | |
| Else {//Function Index == 0b11 | | |
| MGID | 15 | |
| Burst Size | 6 | |
| Resource Index | 11 | |
| Long_TTI_Indicator | 1 | |
| Burst indicator | 1 | Burst Indicator (BI) indicates whether the multicast burst is new or not<br>0b0: The burst is new multicast burst<br>0b1: The burst is retransmitted multicast burst |
| } | | |

Referring to Table 10, a broadcast assignment A-MAP IE message may include a function index field. If a value of the function index field is set to, for example, 0b11, the processor 120 of the M2M device may recognize that the broadcast assignment A-MAP IE message format includes multicast assignment information for an M2M application. A multicast burst for the M2M application may be transmitted in the next frame only once. For the multicast burst for the M2M application, an SPID is set to 0. If the multicast burst indicates a new burst (BI==0), the processor 120 of the M2M device may wait for the multicast burst to be received until the next frame. Meanwhile, if the multicast burst indicates a retransmitted burst (BI==1), the processor 120 of the M2M device may recognize that the BS retransmits the multicast burst.

The following Table 11 shows an example of a multicast retransmission request message (e.g. AAI-MMR-REQ message) format according to the present invention.

set to, for example, 0b00, the AAI-MMR-REQ message may further include an MAP transmission time (M2M transmission time) field. The MAP transmission time field may have a size of 7 bits. Bit indexes #0~#3 indicate 4 Least Significant Bits (LSBs) of a frame number in which an A-MAP IE corresponding to an erroneous burst is transmitted and bit indexes #4~#6 indicate a subframe number in which the A-MAP IE corresponding to the erroneous burst is transmitted.

Meanwhile, if the action code field is set to, for example, 0b01, the processor 170 of the BS may recognize that the AAI-MMR-REQ message misses MPDUs. If the action code field is set to, for example, 0b01, the AAI-MMR-REQ message may further include a Flow ID (FID) field and an SN field. The FID field indicates an FID of an out-of-order MPDU and the SN field indicates an SN of an MPDU missed by the M2M device.

TABLE 11

| Fields | Size (bit) | Value/Description | Condition |
|---|---|---|---|
| M2M group ID | 15 | | |
| Action code | 2 | 0b00: Burst decoding error<br>0b01: Missing MPDUs ($T_{MED}$ Expiration)<br>0b10: $T_{MIA}$ Expiration<br>0b11: reserved | |
| If (Action code == 0b00) { | | | |
| MAP transmission time | 7 | Bit #0~#3: Least Significant 4 bits of the frame number in which the A-MAP IE corresponding to the erroneous burst was transmitted.<br>Bit #4~#6: The sub-frame number in which the A-MAP IE corresponding to the erroneous burst was transmitted. | |
| } else if (Action code == 0b01) { | | | |
| FID | 4 | Flow ID for the MPDU in which the out of order happens | |
| For (i=0; i< N_MPDUs; i++) { | | N_MPDUs: Indicates the number of MPDUs that the device missed.<br>1< N_MPDUs < 15 | |
| SN | 4 | The sequence number of the MPDU which the device missed | |
| } | | | |
| } else if (Action code == 0b10) { | | | |
| FID | 4 | Flow ID for the MPDU related to the expired $T_{MIA}$ | |
| SN | 4 | The sequence number of the latest MPDU that the device received successfully | |
| } | | | |

Referring to Table 11, the M2M device may transmit an AAI-MMR-REQ message (M2M multicast retransmission request message) to the BS to inform the BS that received multicast data contains an error (e.g. burst decoding error, missing of MPDUs (expiration of a timer $T_{MED}$), or expiration of a timer $T_{MED}$).

The AAI-MMR-REQ message may include an M2M group ID field and an action code field. If the action code field is set to, for example, 0b00, the processor 170 of the BS may recognize that the AAI-MMR-REQ message indicates a burst decoding error of the M2M device. If the action code field is If the action code field is set to, for example, 0b10, the processor 170 of the BS may recognize that the AAI-MMR-REQ message indicates expiration of an MIA timer $T_{MIA}$. If the action code field is set to, for example, 0b10, the AAI-MMR-REQ message may further include an FID field and an SN field. The FID field indicates an FID of an MPDU related to the expired $T_{MIA}$ and the SN field indicates an SN of the last MPDU successfully received by the M2M device.

Table 12 shows another example of a ranging request message (e.g. AAI-RNG-REQ message) format according to the present invention.

TABLE 12

| Field | Size (bits) | Value/Description | Condition |
|---|---|---|---|
| Ranging purpose indication | 4 | 0b0000 = Initial network entry<br>0b0001 = HO reentry<br>0b0010 = Network reentry from idle Mode<br>...<br>0b1101 = NS/EP call setup<br>0b1110 = M2M location update<br>0b1111 = reserved | |
| } else if (Ranging Purpose Indication == 0b0011 \|0b0110\|0b0111\| 0b1011\|0b1110) { | | | |
| ... | ... | ... | ... |
| AMS Mobility Information | 2 | | |
| M2M LU purpose indication | 2 | 0b00 = LU for requesting retransmission of multicast data<br>0b01~0b11 = reserved | Present when the Ranging Purpose Indication is set to 0b1110 |
| If (M2M LU purpose indication == 0b00) { | | | |
| M2M group ID | 15 | | |
| Action code | 2 | 0b00: Burst decoding error<br>0b01: Out of order ($T_{MED}$ Expiration)<br>0b10: $T_{MIA}$ Expiration<br>0b11: reserved | |
| If (Action code == 0b00) { | | | |
| MAP transmission time | 7 | Bit #0~#3: Least Significant 4 bits of the frame number in which the A-MAP IE corresponding to the erroneous burst was transmitted.<br>Bit #4~#6: The sub-frame number in which the A-MAP IE corresponding the erroneous burst was transmitted. | |
| } else if (Action code == 0b01) { | | | |
| FID | 4 | Flow ID for out-of-order MPDU | |
| For (i=0; i< N_MPDUs; i++) { | | N_MPDUs: Indicates the number of MPDUs that the device missed.<br>1 < N_MPDUs < 15 | |
| SN | 10 | The sequence number of the MPDU that the device missed | |
| }<br>} else if (Action code == 0b10) { | | | |
| FID | 4 | Flow ID for the MPDU related to the expired $T_{MIA}$ | |
| SN | 10 | The sequence number of the latest MPDU that the device received successfully | |
| }<br>}<br>SMS<br>} else if (Ranging Purpose Indication == 0b0100) { | | | |

Referring to Table 12, the M2M device may transmit an AAI-RNG-REQ message to inform the BS of the purpose of ranging. The AAI-RNG-REQ message includes a ranging purpose indication field. If the ranging purpose indication field is set to, for example, 0b1110 as shown in Table 12, the AAI-RNG-REQ message indicates that the purpose of ranging is M2M location update. If the ranging purpose indication field is set to, for example, 0b1110, the AAI-RNG-REQ message may further include an AMS mobility information field and an M2M Location Update (LU) purpose indication field. If the M2M LU purpose indication field is set to 0b00, this may indicate a multicast data retransmission request. If the M2M LU purpose indication field is set to 0b00, the AAI-RNG-REQ message may further include an M2M group ID field and an action code field.

If the action code field set to, for example, 0b00 to indicate a burst decoding error, the AAI-RNG-REQ message may further include a MAP transmission time field. The MAP transmission time field may have a size of 7 bits. Bit indexes #0~#3 indicate 4 LSBs of a frame number in which an A-MAP IE corresponding to an erroneous burst is transmitted and bit indexes #4~#6 indicate a subframe number in which the A-MAP IE corresponding to the erroneous burst is transmitted.

If the action code field is set to, for example, 0b01 to indicate an out-of-order MPDU (expiration of $T_{MED}$), the AAI-RNG-REQ message may further include an FID field and an SN field. The FID field indicates an FID of an out-of-order MPDU and the SN field indicates an SN of an MPDU missed by the M2M device. Meanwhile, if the action code field is set to, for example, 0b10 to indicate expiration of an MIA timer $T_{MIA}$, the AAI-RNG-REQ message may include an FID field and an SN field. The FID field indicates an FID of an MPDU related to the expired $T_{MIA}$ and the SN field indicates an SN of the last MPDU successfully received by the M2M device.

To provide reliability of multicast data, the BS may retransmit an unsolicited multicast burst to the M2M device one time. The M2M device may request that the BS retransmit multicast data using NACK-based MAC level feedback. When the M2M device fails to decode a multicast burst, if the multicast burst is not a new burst (BI=1), the M2M device transmits MAC level feedback to the BS. If a multicast MPDU has an out-of-order sequence (e.g. the M2M device receives an MPDU of SN #N before receiving an MPDU of SN #N−1), the M2M device has not received a missed MPDU within an MED timer $T_{MED}$. If the M2M device receives the missed MPDU before the MED timer $T_{MED}$ expires, the timer $T_{MED}$ stops. If the timer $T_{MED}$ expires when an MPDU arrives out of sequence, the M2M device transmits MAC level feedback to the BS.

Upon receiving first multicast data, the processor 120 of the M2M device in connected mode starts an MIA timer $T_{MIA}$. Upon receiving a paging message indicating that there is multicast traffic for an M2M group to which the M2M device belongs, the M2M device in idle mode starts the MIA timer $T_{MIA}$.

$T_{MIA}$ is reset whenever multicast data is received. $T_{MIA}$ stops when the M2M device receives an MTEEH. If the timer $T_{MIA}$ expires, M2M device transmits MAC level feedback to inform the BS of an error state. For MAC level feedback, the M2M device needs to transmit an M2M multicast retransmission request message (e.g. AAI-MMR-REQ message) in the connected mode and transmit a ranging request message (e.g. AAI-RNG-REQ message (i.e. a location update procedure)) in the idle mode. Each of the AAI-MMR-REQ message and AAI-RNG-REQ message may include an M2M group ID (MGID) field, a MAP transmission time field, an SN field indicating SNs of missed MPDUs, and an SN field indicating an SN of the last successfully received MPDU.

Upon receiving the AAI-MMR-REQ message from the M2M device, the BS should retransmit the missed multicast data to the M2M device. Upon receiving the AAI-RNG-REQ message including multicast MAC level feedback information from the M2M device, the BS should transmit an AAI-REQ-RSP message and retransmit the missed multicast data to the M2M device.

If the M2M device has not received an MTEEH within a Multicast Transmission End (MTE) timer $T_{MTE}$ after receiving the multicast MPDU, the M2M device should transmit MAC level feedback to the BS. In the connected mode, the MTE timer $T_{MTE}$ is started when the M2M device receives first multicast data and, in the idle mode, $T_{MTE}$ is started when the M2M device receives a paging message indicating that there is multicast traffic. If an MTST is included in the paging message (e.g. AAI_PAG-ADV message), $T_{MTE}$ may be reset at the MTST or whenever the multicast data is received. If the M2M device receives the MTEEH, $T_{MTE}$ ends.

The following Table 13 shows another example of the ranging request message (e.g. AAI-RNG-REQ message) format according to the present invention.

TABLE 13

| Field | Size (bits) | Value/Description | Condition |
|---|---|---|---|
| Ranging purpose indication | 4 | 0b0000 = Initial network entry<br>0b0001 = HO reentry<br>0b0010 = Network reentry from idle Mode<br>...<br>0b1101 = NS/EP call setup<br>0b1110 = M2M location update<br>0b1111 = reserved | |
| ... | ... | ... | ... |
| } else if (Ranging Purpose Indication == 0b0011 \|0b0110\|0b0111\| 0b1011\|0b1110) { | | | |
| ... | ... | ... | ... |
| AMS Mobility Information | 2 | | |
| M2M LU purpose indication | 2 | 0b00 = LU for requesting retransmission of multicast data<br>0b01~0b11 = reserved | Present when the Ranging Purpose Indication is set to 0b1110 |
| If (M2M LU purpose indication == 0b00) { | | | |
| M2M group ID | 15 | | |
| Action code | 2 | 0b00: Burst decoding error<br>0b01: Missing MPDU<br>0b10: Missing MTEEH<br>0b11: reserved | |

TABLE 13-continued

| Field | Size (bits) | Value/Description | Condition |
|---|---|---|---|
| If (Action code == 0b00) { | | | |
| MAP transmission time | 7 | Bit #0~#3: Least Significant 4 bits of the frame number in which the A-MAP IE corresponding to the erroneous burst was transmitted. Bit #4~#6: The sub-frame number in which the A-MAP IE corresponding to the erroneous burst was transmitted. | |
| } else if (Action code == 0b01) { | | | |
| FID | 4 | Flow ID for out-of-order MPDU | |
| For (i=0; i< N_MPDUs; i++) { | | N_MPDUs: Indicates the number of MPDUs which the device missed. 1 < N_MPDUs < 8 | |
| SN | 4 | 4 bits LSB of sequence number of the MPDU that the device missed | |
| } | | | |
| } else if (Action code == 0b10) { | | | |
| FID | 4 | Flow ID for the MPDU related to the expired $T_{MTE}$ | |
| SN | 10 | Sequence number of the latest MPDU that the device received successfully | |
| } | | | |
| } | | | |
| SMS | | | |
| } else if (Ranging Purpose Indication == 0b0100) { | | | |
| ... | ... ... | ... | |

Referring to Table 13, if an M2M LU purpose indication field of the AAI-RNG-REQ message indicates LU for a multicast data retransmission request, an action code field may indicate one of a burst decoding error, missing of an MPDU and missing of an MTEEH.

As opposed to Table 12, if the action code field is set to, for example, 0b01 in Table 13, this indicates that the M2M device misses an MPDU and, if the action code field is set to, for example, 0b10, this indicates that the M2M device misses an MTEEH. If the action code field indicates 0b10, the AAI-RNG-REQ message may further include an FID field and an SN field. The FID field indicates an FID for an MPDU related to an expired timer and the SN field indicates an SN of the last MPDU successfully received by the M2M device.

The following Table 14 shows another example of the AAI-MMR-REQ message format according to the present invention.

TABLE 14

| Fields | Size (bits) | Value/Description | Condition |
|---|---|---|---|
| M2M group ID | 15 | | |
| Action code | 2 | 0b00: Burst decoding error 0b01: Missing MPDUs 0b10: Missing MTEEH 0b11: Reserved | |
| If (Action code == 0b00) { | | | |
| MAP transmission time | 7 | Bit #0~#3: Least Significant 4 bits of the frame number in which the A-MAP IE corresponding to the erroneous burst was transmitted. Bit #4~#6: The sub-frame number in which the A-MAP IE corresponding to the erroneous burst was transmitted. | |
| } else if (Action code == 0b01) { | | | |
| FID | 4 | Flow ID for the MPDU in which the out of order happens | |
| For (i=0; i< N_MPDUs; i++) { | | N_PDUs: Indicates the number of MPDUs which the device missed. 1 < N_MPDUs < 15 | |

TABLE 14-continued

| Fields | Size (bits) | Value/Description | Condition |
|---|---|---|---|
| SN | 4 | 4 bits LSB of sequence number of the MPDU which the device missed | |
| } | | | |
| } else if (Action code == 0b10) { | | | |
| FID | 4 | Flow ID for the MPDU related to the expired $T_{MTE}$ | |
| SN | 10 | Sequence number of the latest MPDU which the device received successfully | |
| } | | | |

Referring to Table 14, the M2M device may transmit an M2M multicast retransmission request (AAI-MMR-REQ) message to inform the BS that received multicast data contains an error (e.g. one of a burst decoding error, missing of MPDUs (expiration of $T_{MED}$) and missing of an MTEEH).

The AAI-MMR-REQ message may include an M2M group ID field and an action code field. If the action code field is set to, for example, 0b00, the processor 170 of the BS may recognize that the AAI-MMR-REQ message indicates a burst decoding error of the M2M device. If the action code field is set to, for example, 0b00, the AAI-MMR-REQ message may further include a MAP transmission time field. The MAP transmission time field may have a size of 7 bits. Bit indexes #0~#3 indicate 4 LSBs of a frame number in which an A-MAP IE corresponding to an erroneous burst is transmitted and bit indexes #4~#6 indicate a subframe number in which the A-MAP IE corresponding to the erroneous burst is transmitted.

Meanwhile, if the action code field is set to, for example, 0b01, the processor 170 of the BS may recognize that the AAI-MMR-REQ message misses MPDUs. If the action code field is set to, for example, 0b01, the AAI-MMR-REQ message may further include an FID field and an SN field. The FID field indicates an FID of an out-of-order MPDU and the SN field indicates 4 LSBs of an SN of an MPDU missed by the M2M device.

If the action code field is set to, for example, 0b10, the processor 170 of the BS may recognize that the AAI-MMR-REQ message indicates that AAI-MMR-REQ message misses an MTEEH. If the action code field is set to, for example, 0b10, the AAI-MMR-REQ message may include an FID field and an SN field. The FID field indicates an FID of an MPDU related to the expired $T_{MTE}$ and the SN field indicates an SN of the last MPDU successfully received by the M2M device.

According to the various embodiments of the present invention described above, reliability of multicast traffic transmission can be guaranteed and efficient communication can be performed.

Names of the message formats proposed in this disclosure may be changed in various forms in a variety of communication system specifications. In addition, names of fields of each message format may also be changed to other names having the same meanings indicated by these fields. The size (the number of bits) of each field is not limited to the size proposed in each table.

The various exemplary embodiments related to multicast data transmission between an M2M device and a BS have been described. That is, although embodiments applied to multicast data have been described, the embodiments are applicable to unicast data or broadcast data. In addition, while multicast data transmission between the M2M device and BS has been described, the description does not exclude application to a Human Type Communication (HTC) device (i.e. a mobile terminal).

Further, although the embodiments of the present invention have been described using message formats used in an IEEE 802.16m system, the message formats are not limited by the embodiments and may be applied to message formats in a 3GPP LTE or LTE-A system, that have different names but perform the same function. Meanwhile, field names of each message format may be referred to by other names performing the same function and, therefore, they are not restricted by the embodiments.

The embodiments described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

INDUSTRIAL APPLICABILITY

The method for receiving multicast data at an M2M device in a wireless communication system and the M2M device therefore are applicable to various mobile communication systems such as 3GPP LTE, LTE-A, IEEE 802, etc.

The invention claimed is:
1. A method for receiving multicast data at a Machine-to-Machine (M2M) device in a wireless communication system, the method comprising:
receiving multicast data from a base station in an idle mode;

transmitting a ranging request message, upon failing to decode the multicast data, wherein the ranging request message includes a ranging purpose indication (RPI) and a multicast group identifier (ID) associated with the M2M device; and re-receiving the multicast data from the base station through a ranging response message in response to the ranging request message based on the multicast group ID, if the RPI indicates a multicast data retransmission request from the M2M device.

2. The method according to claim 1, further comprising:
receiving uplink resource assignment information for transmitting an acknowledgement (ACK) signal for the multicast data in response to the ranging request message from the base station, together with the multicast data.

3. The method according to claim 2, further comprising:
transmitting a positive ACK signal to the base station based on the uplink resource allocation information, upon succeeding in decoding the re-received multicast data from the base station.

4. The method according to claim 2, wherein the uplink resource allocation information is transmitted as a unicast control information type.

5. The method according to claim 2,
wherein failing to decode the multicast data is caused by one of a decoding error of a downlink multicast data burst, missing a medium access control (MAC) protocol data unit (MPDU) sequence number corresponding to the multicast data confirmed by checking the MPDU sequence number, expiration of a timer which is reset whenever the multicast data is received, and non-reception of control information for the multicast data at an indicated multicast data transmission start time.

6. The method according to claim 1, further comprising:
transmitting a positive acknowledgement (ACK) signal, upon succeeding in decoding the multicast data received through the ranging response message.

7. A Machine-to-Machine (M2M) device for receiving multicast data in a wireless communication system, the M2M device comprising:

a radio frequency (RF) unit configured to receive and transmit data; and a processor configured to process the data received and transmitted by the RF unit, wherein the processor is further configured to:
receive multicast data from a base station in an idle mode,
transmit a ranging request message, upon failing to decode the multicast data, wherein the ranging request message includes a ranging purpose indication (RPI) and a multicast group identifier (ID) associated with the M2M device, and re-receive the multicast data from the base station through a ranging response message in response to the ranging request message based on the multicast group ID, if the RPI indicates a multicast data retransmission request from the M2M device.

8. The M2M device according to claim 7,
wherein the processor failing to decode the multicast data is caused by one of a decoding error of a downlink multicast data burst, missing a medium access control (MAC) protocol data unit (MPDU) sequence number corresponding to the multicast data confirmed by checking the MPDU sequence number, expiration of a timer which is reset whenever the multicast data is received, and non-reception of control information for the multicast data at an indicated multicast data transmission start time.

* * * * *